(12) United States Patent
Gollier et al.

(10) Patent No.: US 10,962,795 B1
(45) Date of Patent: Mar. 30, 2021

(54) DISPLAY WITH A RESOLUTION ENHANCED REGION

(71) Applicant: FACEBOOK TECHNOLOGIES, LLC, Menlo Park, CA (US)

(72) Inventors: Jacques Gollier, Bellevue, WA (US); Ying Geng, Bellevue, WA (US); Yusufu Njoni Bamaxam Sulai, Bothell, WA (US); Fenglin Peng, Redmond, WA (US); Brian Wheelwright, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 42 days.

(21) Appl. No.: 16/222,922

(22) Filed: Dec. 17, 2018

(51) Int. Cl.
| | |
|---|---|
| *G02B 27/01* | (2006.01) |
| *G09G 3/3208* | (2016.01) |
| *G02B 27/28* | (2006.01) |
| *G02B 27/00* | (2006.01) |
| *G09G 3/00* | (2006.01) |

(52) U.S. Cl.
CPC ....... *G02B 27/283* (2013.01); *G02B 27/0093* (2013.01); *G02B 27/286* (2013.01); *G09G 3/001* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2006/0170834 A1* | 8/2006 | Kim | H04N 13/305 349/15 |
| 2011/0141250 A1* | 6/2011 | Jan | H04N 13/363 348/58 |
| 2018/0136471 A1* | 5/2018 | Miller | G02B 27/0189 |

* cited by examiner

*Primary Examiner* — Carl Adams
(74) *Attorney, Agent, or Firm* — Morgan, Lewis & Bockius LLP

(57) ABSTRACT

A display device includes a first display, a second display and one or more optical elements. The first display is configured to provide a first light that corresponds to a first image, the second display is configured to provide a second light that corresponds to a second image, and the one or more optical elements are configured to project a display image using the first light and the second light. The display image includes the first image and the second image. The display device is configured to project the first image with a first magnification and project the second image with a second magnification that is distinct from the first magnification. Also disclosed is a method performed by the display device.

20 Claims, 23 Drawing Sheets

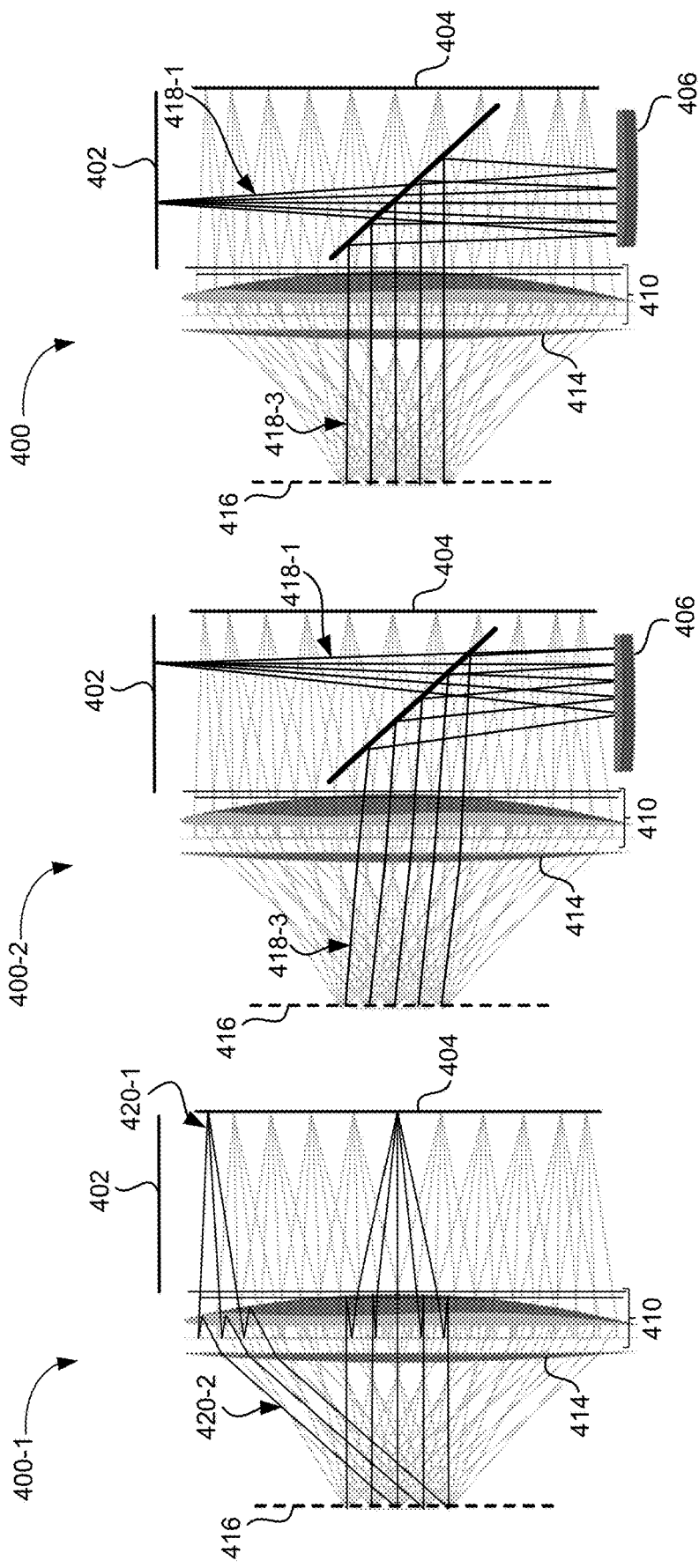

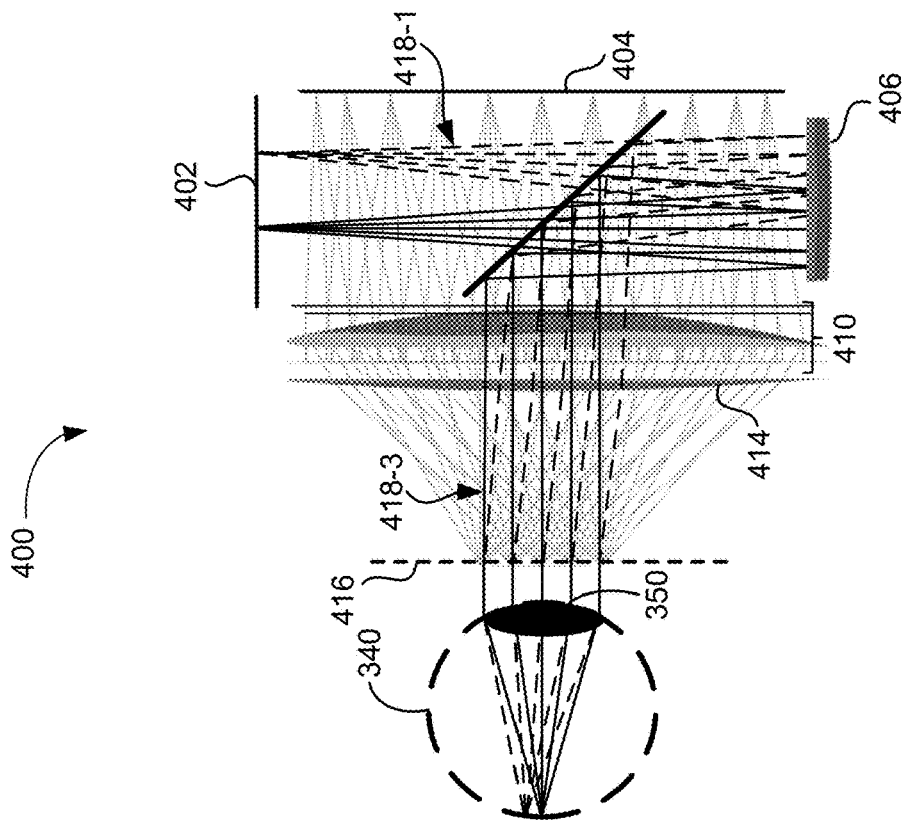
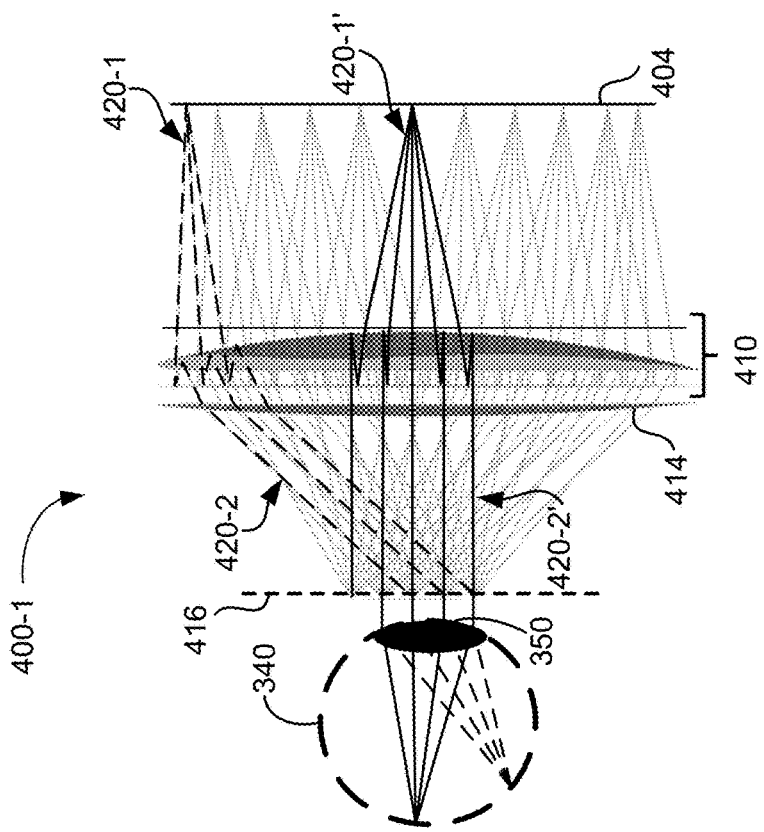
Figure 4N
Figure 4M

DISPLAY WITH A RESOLUTION ENHANCED REGION

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

High resolution displays are desired in head-mounted display devices. Because a display of a head-mounted display device is located adjacent to eyes of a user, if a low resolution display is used, the spacing between pixels of the display would be visible to the user (as if the view is seen through a screen door). However, high resolution displays are expensive and in some cases, consumes more energy than low resolution displays. In some cases, a resolution higher than those of currently available high resolution displays is desired in head-mounted display devices.

SUMMARY

Accordingly, there is a need for head-mounted display devices with an increased resolution. Such head-mounted display devices will enhance user experience with virtual reality and/or augmented reality operations.

The above deficiencies and other problems associated with conventional head-mounted displays are reduced or eliminated by the disclosed display devices.

In accordance with some embodiments, a display device includes a first display, a second display, and one or more optical elements. The first display is configured to provide a first light that corresponds to a first image, the second display is configured to provide a second light that corresponds to a second image, and the one or more optical elements are configured to project a display image using the first light and the second light, the display image including the first image and the second image. The display device is configured to project the first image with a first magnification and project the second image with a second magnification that is distinct from the first magnification.

In accordance with some embodiments, a method performed by a display device including a first display, a second display, and one or more optical elements is disclosed. The method includes providing, with the first display, a first light that corresponds to a first image, and providing, with the second display, a second light that corresponds to the second image. The method also includes projecting, with the one or more optical elements, a display image using the first light and the second light. The display image includes the first image and the second image The method further includes projecting, with the one or more optical elements, the first image with a first magnification and projecting, with the one or more optical elements, the second image with a second magnification that is distinct from the first magnification.

Thus, the disclosed embodiments provide for display devices and methods for display devices with resolution enhanced regions. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4B-4D are schematic illustrations of the display device of FIG. 4A in accordance with some embodiments.

FIGS. 4M and 4N are schematic illustrations of the display device of FIG. 4A in accordance with some embodiments.

Figure 1:
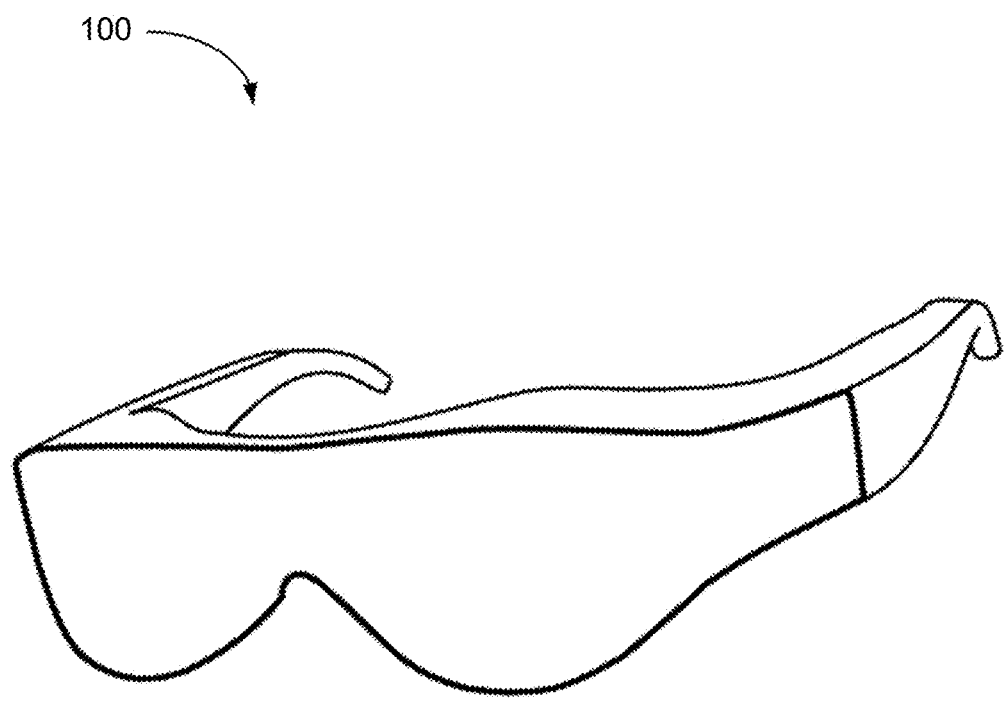
FIG. 1 is a perspective view of a display device in accordance with some embodiments.

These figures are not drawn to scale unless indicated otherwise.

DETAILED DESCRIPTION

There is a need for head-mounted display devices with a high resolution for enhancing user experience with virtual reality and/or augmented reality operations.

The present disclosure provides display devices with a resolution enhanced region. The display device is configured to project a first image on an image plane with a first resolution and project a second image on the same image plane with a second resolution, which is higher than the first resolution. The different resolutions are achieved by projecting the first image and the second image having the same resolution on the image plane through optical paths with different effective focal lengths (EFL) so that the second image has a higher magnification that the first image.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first reflector could be termed a second reflector, and, similarly, a second reflector could be termed a first reflector, without departing from the scope of the various described embodiments. The first reflector and the second reflector are both light reflectors, but they are not the same reflector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
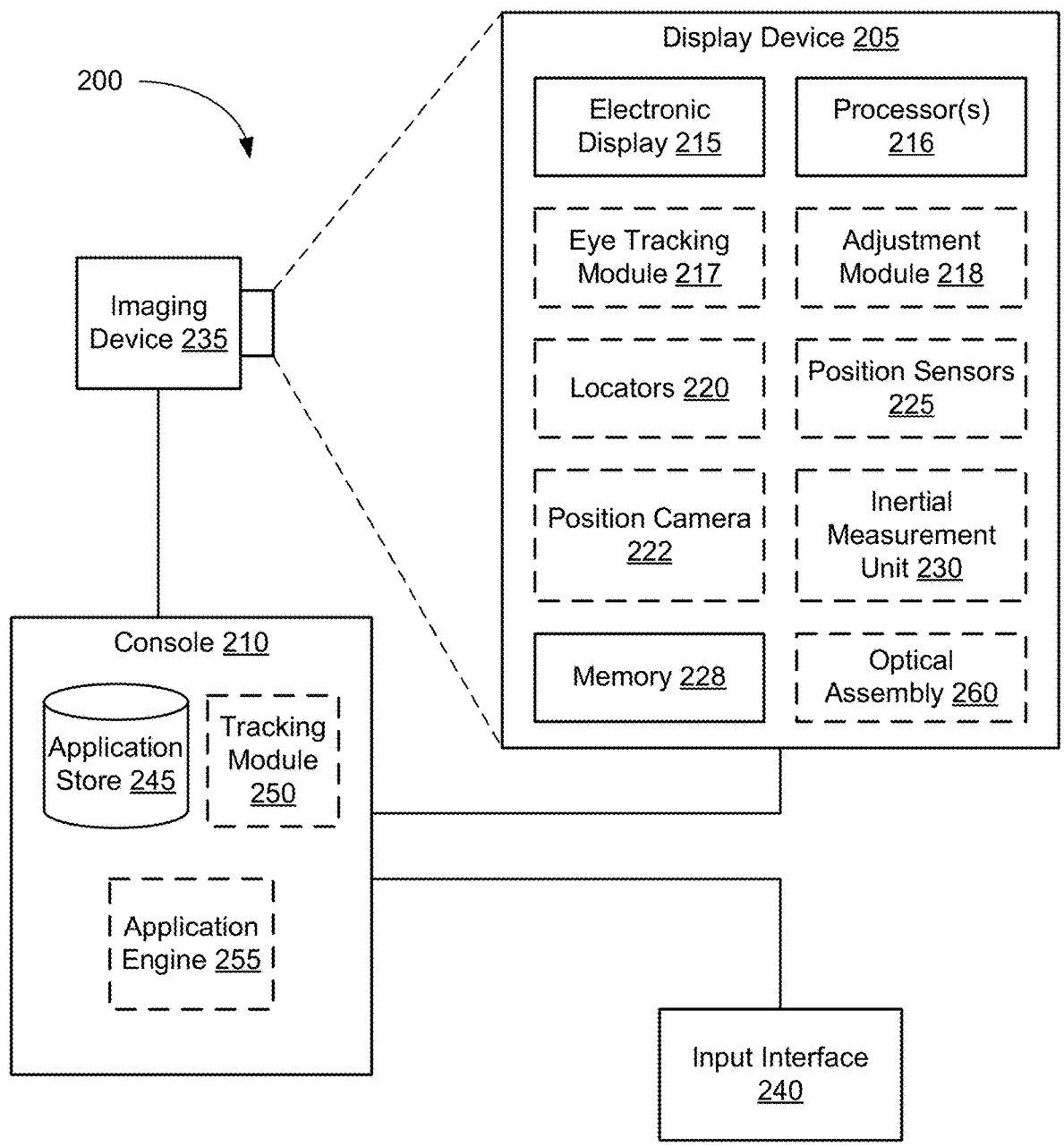
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
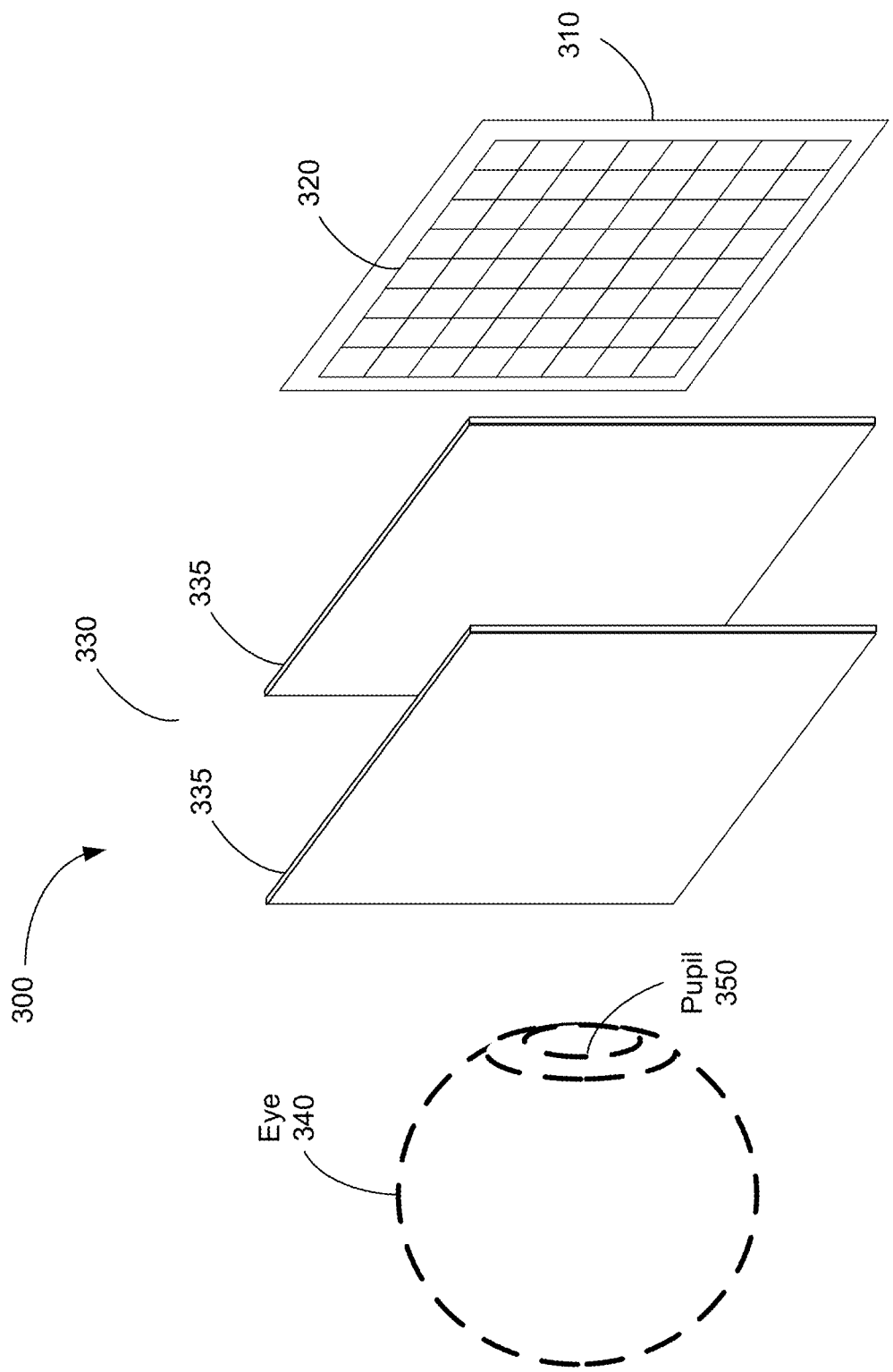
FIG. 3 is an isometric view of a display device in accordance with some embodiments.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device array 310 and an optical assembly 330, which may include one or more lenses and/or other optical components 335. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the optical assembly 330. In some embodiments, display device 300 uses an emission intensity array to facilitate providing image light to a location of pupil 350 of eye 340 of a user, and minimize the amount of image light provided to other areas in the eyebox.

One or more lenses 335 in optical assembly 330 receive the modified image light (e.g., attenuated light) from emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 335 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

Figure 4A:
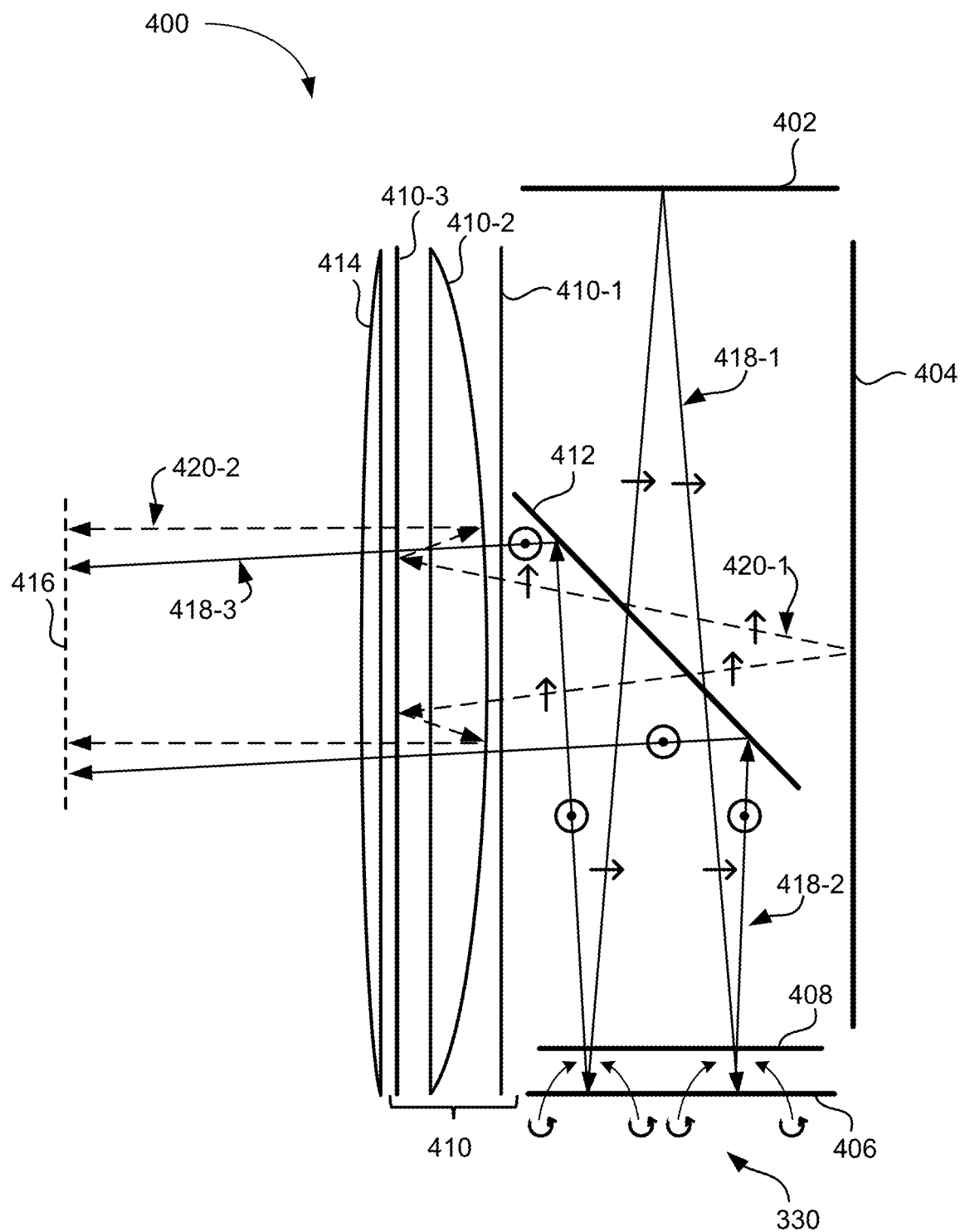
FIG. 4A is a schematic illustration of a display device in accordance with some embodiments.

FIG. 4A is a schematic illustration of display device 400 in accordance with some embodiments. In some embodiments, display device 400 corresponds to display device 100 and is configured to be worn on a head of a user. Display device 400 is configured to project light corresponding to one or more images to be displayed onto reference plane 416 (e.g., an eyebox of a wearer of display device 400) so that a rendered image includes a resolution enhanced region preferably in a central area of a field of view whereas an area surrounding and/or adjacent to the resolution enhanced region has a lower resolution than the enhanced region. The two regions are achieved by projecting light onto reference plane 416 with different focal lengths, so that a portion of reference plane 416 corresponding the resolution enhanced region has a longer focal length and receives a portion of the image having a lower magnification than an area surrounding and/or adjacent to the resolution enhanced region. The higher resolution is achieved by a longer effective focal length between a light source (e.g., display 402) and reference plane 416. The lower magnification also ensures that the high resolution portion of the image and the rest of the image correspond to one another and the final rendered image is not distorted. The configuration of a display device described with respect to FIG. 4A provides for a compact solution for providing high resolution images to a user wearing a head-mounted display device.

Display device includes display 404, display 402, and an optical assembly 330 including reflector 406, polarization plate 408, reflector 412 and lens assembly 410. In some embodiments, display 404 corresponds to light emission device array 310 described above with respect to FIG. 3. In some embodiments, display 404 is a liquid crystal display (LCD). Display 404 is positioned facing reference plane 416 (e.g., display 404 is positioned substantially parallel to reference plane 416). Display 404 projects light 420-1 (e.g., image light) having a first linear polarization toward reference plane 416 via reflector 412 and lens assembly 410. Reflector 412 is a polarization selective reflector (e.g., a polarization beam splitter) configured to transmit light with a first linear polarization (e.g., light 420-1) while reflecting light with a second linear polarization orthogonal to the first linear polarization. In some embodiments, reflector 412 has a smaller size (e.g., a smaller width) than display 404 and/or smaller size than an area illuminated by light 420-1 projected by display 404. After being transmitted through reflector 412, light 420-1 is received by lens assembly 412 that is configured to project light 420-1 onto reference plane 416. Lens assembly 410 includes polarization plate 410-1 (e.g., a quarter-wave plate), partial mirror 410-2 (e.g., a 50:50 mirror), and optical element 410-3 including a polarization plate (e.g., a quarter-wave plate) and a reflective polarizer. In FIG. 4A, partial mirror 410-2 has a plano-convex shape and partial mirror 410-2 is configured to redirect light reflecting from the convex shaped surface. Light 420-1 is transmitted through lens assembly 410 as light 420-2 so that the light makes a double-bounce before exiting lens assembly 410. Lens assembly 410 thereby imparts large optical power on light 420-1 traveling from display 404 onto reference plane 416. In particular, the reflection on partial reflector 410-2 adds the majority of optical power to this ray path. Increased optical power increases magnification rate of image light 420-1. Principles of lens assembly 410 will be described in further detail below with respect to FIGS. 6A and 6B.

Display 402 is positioned substantially orthogonal to display 404 (e.g., display 402 and display 404 form an angle that is 90 degrees+/−3 degree). In some embodiments, display 402 is a same type of display as display 404 (e.g., displays 402 and 404 are both LCDs). In some embodiments, display 402 has a pixel resolution (e.g., pixels per inch, PPI) corresponding to a pixel resolution of display 404. The configuration of display device 400 having two displays of the same display technology has benefits over configurations using displays of different type (e.g., a LCD combined with a high-resolution OLED microdisplay). Firstly, matching of color gamut of two different types of display technologies is challenging and may affect an overall image quality. Secondly, different types of display technologies have different responses to temperature and/or aging affecting long term image quality.

In FIG. 4A, display 402 projects light 418-1 (e.g., image light) having the first linear polarization toward reflector 412. Reflector 412 transmits light 418-1 toward reflector 406 (e.g., a mirror) through polarization plate 408 (e.g., a quarter-wave plate) positioned between reflector 412 and reflector 406. In some embodiments, reflector 406 is a flat reflector reflecting light 418-1 toward reflector 412. In some embodiments, reflector 406 is a curved reflector and is configured to reflect and direct (e.g., focus or defocus) light 418-1 toward reflector 412. While travelling from reflector 412 to reflector 406 and back, light 418-1 passes through polarization plate 408 twice. Polarization plate 408 is configured to change polarization of light 418-1 so that when passing through polarization plate 408 before and after being reflected, light 418-1 is converted to light 418-2 with the second linear polarization. As shown in FIG. 4A, polarization plate 408 first changes polarization of light 418-1 from the first linear polarization to a first circular polarization. When light 418-1 with the first circular polarization is reflected from reflector 406, the polarization of light 418-1 is changed to a second circular polarization. For example, the first circular polarization is a left-handed polarization and the second circular polarization is a right-handed polarization, or vice versa. It is noted that directions of polarizations are indicated with respect to direction of a respective light in FIG. 4A and throughout the figures. For example, light propagating to the left with left-handed polarization is indicated with the same rotating arrow as light propagating to the right with right-handed polarization. As light 418-1 passes through polarization plate 408 for the second time, polarization plate 408 converts light 418-1 to light 418-2 with the second linear polarization. Reflector 412 is configured to reflect light 418-2 having the second polarization toward reference plane 416 via lens assembly 410. Lens assembly 410 is configured to receive and transmit light 418-2 as light 418-3 onto reference plane 416. In some embodiments, lens assembly 410 is optically coupled with one or more lenses 414. One or more lenses 414 are configured to further focus light 420-2 and light 418-3 passing through lens assembly 410 onto reference plane 416. In FIG. 4A, lens 414 is a plano-convex lens.

Light 420-1, projected by display 404, corresponds to a first image and light 418-1 projected by display 402 corresponds to a second image. The effective focal length (EFL2) of light 418-1 from display 402 onto reference plane 416 as light 418-3 is longer than the effective focal length (EFL1) of light 420-1 from display 404 onto reference plane 416. In some embodiment, EFL2 corresponds to 1.5×EFL1, 1.75× EFL1 2×EFL1, 2.25×EFL1, 2.5×EFL1, 2.75×EFL1, 3×EFL1, 3.25×EFL1, 3.5×EFL1, 3.75×EFL1 or 4×EFL1. Therefore, at reference plane 416, an image rendered by light 418-1 has a longer focal length, and thereby a higher resolution, than an image rendered by light 420-1. Correspondingly, the image displayed by light 418-1 has a lower magnification than the image displayed by light 420-1. Light 418-3 therefore creates a region of enhanced resolution on reference plane 416 compared to light 420-2. In some embodiments, the region of enhanced resolution is positioned in a central region of field of view and is surrounded by, or adjacent to, the region of a lower resolution. In some embodiments, the region of enhanced resolution overlaps the lower resolution regions. The regions of different resolutions will be further discussed below with respect to FIGS. 8A-8C.

In some embodiments, the light projected by display 404 has a circular polarization, and display 404 is further optically coupled with a linear polarizer configured to convert circularly polarized light provided by display 404 into a linearly polarized light. For example, when display 404 is an organic light-emitting diode (OLED), the light projected by display 404 has a circular polarization.

FIGS. 4B-4D are schematic illustrations of display device 400 in accordance with some embodiments. FIGS. 4B-4D are further illustrations of the light paths of light 420-1 and light 418-1 projected in display device 400. FIG. 4A shows display device portions 400-1 and 400-2. FIG. 4B shows display device portion 400-1 with light 420-1 projected by display 404 and directed by lens assembly 410 and lens 414 as light 420-2 onto reference plane 416. FIG. 4C shows display device portion 400-2 with light 418-1 projected by display 402, reflected by reflector 406, further reflected by reflector 412 and directed by lens assembly 410 and lens 414 as light 418-3 onto reference plane 416. In FIGS. 4C and 4D, reflector 406 is shown to be a curved reflector configured to act as a focusing element of light 418-2. FIG. 4D shows display device 400 where display device portions 400-1 and 400-2 are combined, similar to what is shown in FIG. 4A. In FIG. 4D, light 418-3 rendering the image with higher resolution overlaps light 420-2 rendering a lower resolution image on reference plane 416. The image rendered by light 418-3 corresponds to a portion (in some cases, a central portion) of an image to be displayed to a user. The image rendered by light 420-2 corresponds to a different portion (in some case, a peripheral portion) of the image to be displayed to the user. An example of the image portions rendered by light 418-3 and 420-2 are described below with respect to FIG. 4P.

Figure 4E:
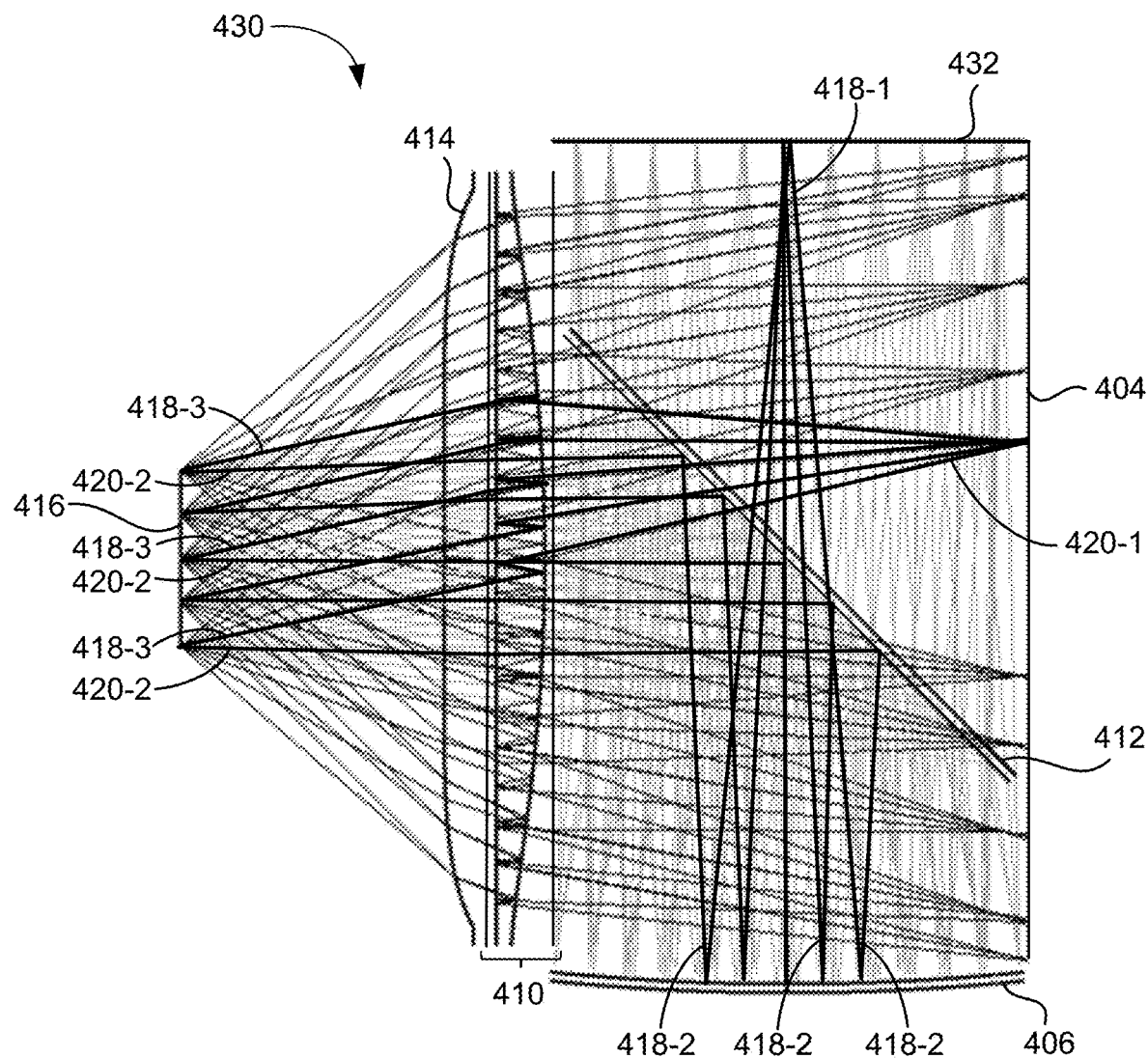
FIG. 4E is a schematic illustration of a display device in accordance with some embodiments.

FIG. 4E is a schematic illustration of display device 430 in accordance with some embodiments. Display device 430 corresponds to display device 400 described above with respect to FIG. 4A, except that display device 430 includes display 432 projecting light 418-1. Display 432 has a greater width than display 402 shown in FIG. 4A, requiring greater distance between reference plane 416 and display 404. Display device 430 provides a wider field of view on reference plane 416 compared to display device 400 in FIG. 4A. Additionally, in display device 432, shown in FIG. 4E, light 420-1 projected by display 404 is not projected from a central area of display 404.

Figure 4F:
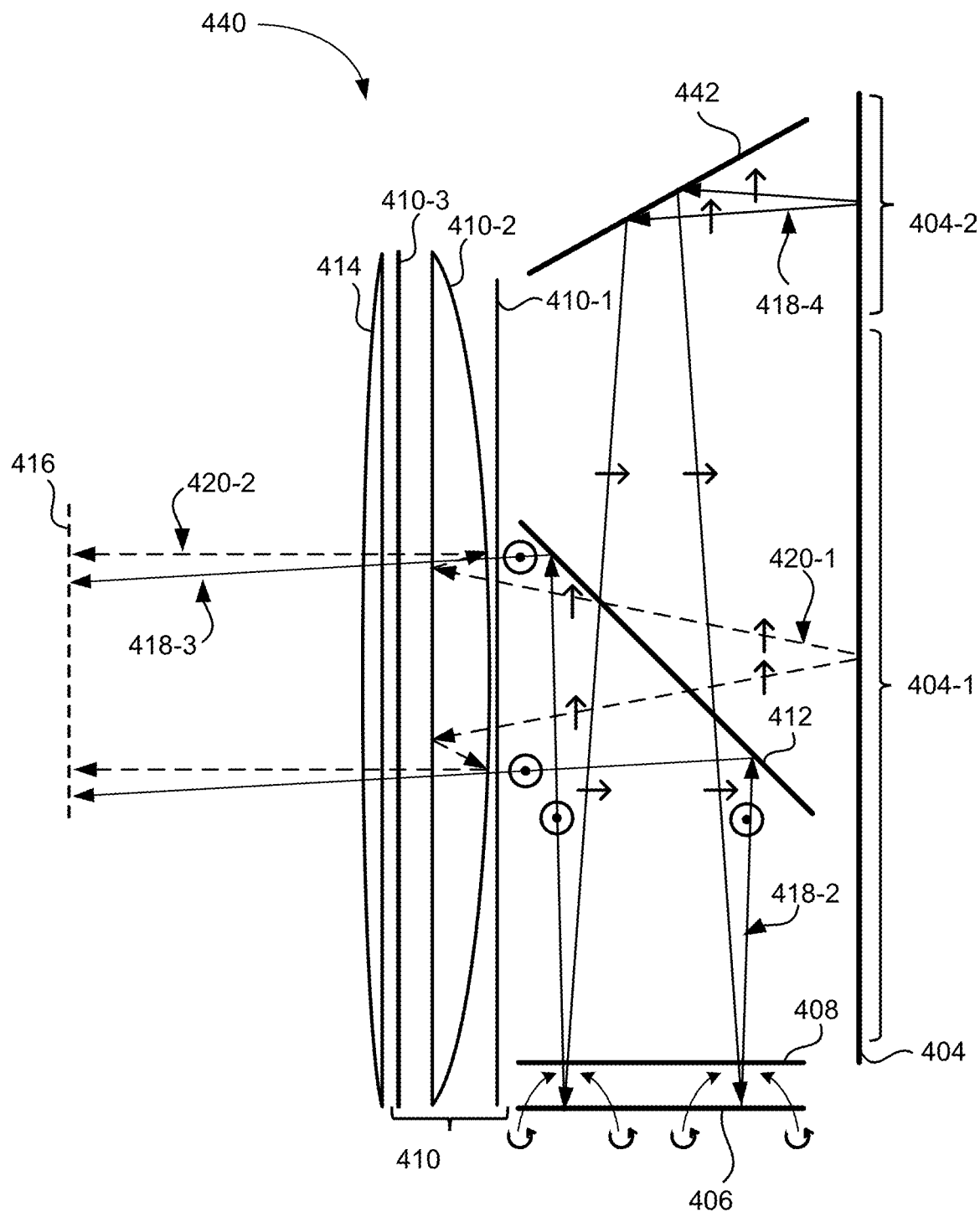
FIG. 4F is a schematic illustration of a display device in accordance with some embodiments.

FIG. 4F is a schematic illustration of display device 440 in accordance with some embodiments. Display device 440 corresponds to display device 400 described above with respect to FIG. 4A, except that display device 440 excludes display 402. Instead, in FIG. 4F, display 404 includes portion 404-1 and portion 404-2. Portion 404-1 is configured to provide light 420-1 as described above with respect to FIG. 4A. Portion 404-2 is configured to provide light 418-4 having the first polarization toward reflector 442 (e.g., a mirror). Reflector 442 receives and reflects light 418-4 toward reflector 412, which transmits light 418-4 having the first polarization toward reflector 406. As described above with respect to FIG. 4A, light 418-4 reflected from reflector 406 toward reflector 412 as light 418-2 has the second polarization after passing through polarization plate 408 twice. In some embodiments, portion 404-2 is adjacent and contiguous with portion 404-1 (e.g., portions 404-1 and 404-2 form a single display 404). In some embodiments, portion 404-2 is distinct from portion 404-1. In some embodiments, portion 404-1 is larger compared to portion 404-2. In some embodiments, portion 404-1 extends over a central area of display 404 whereas portion 404-2 extends from portion 404-1 toward a peripheral area of display 404.

Figure 4G:
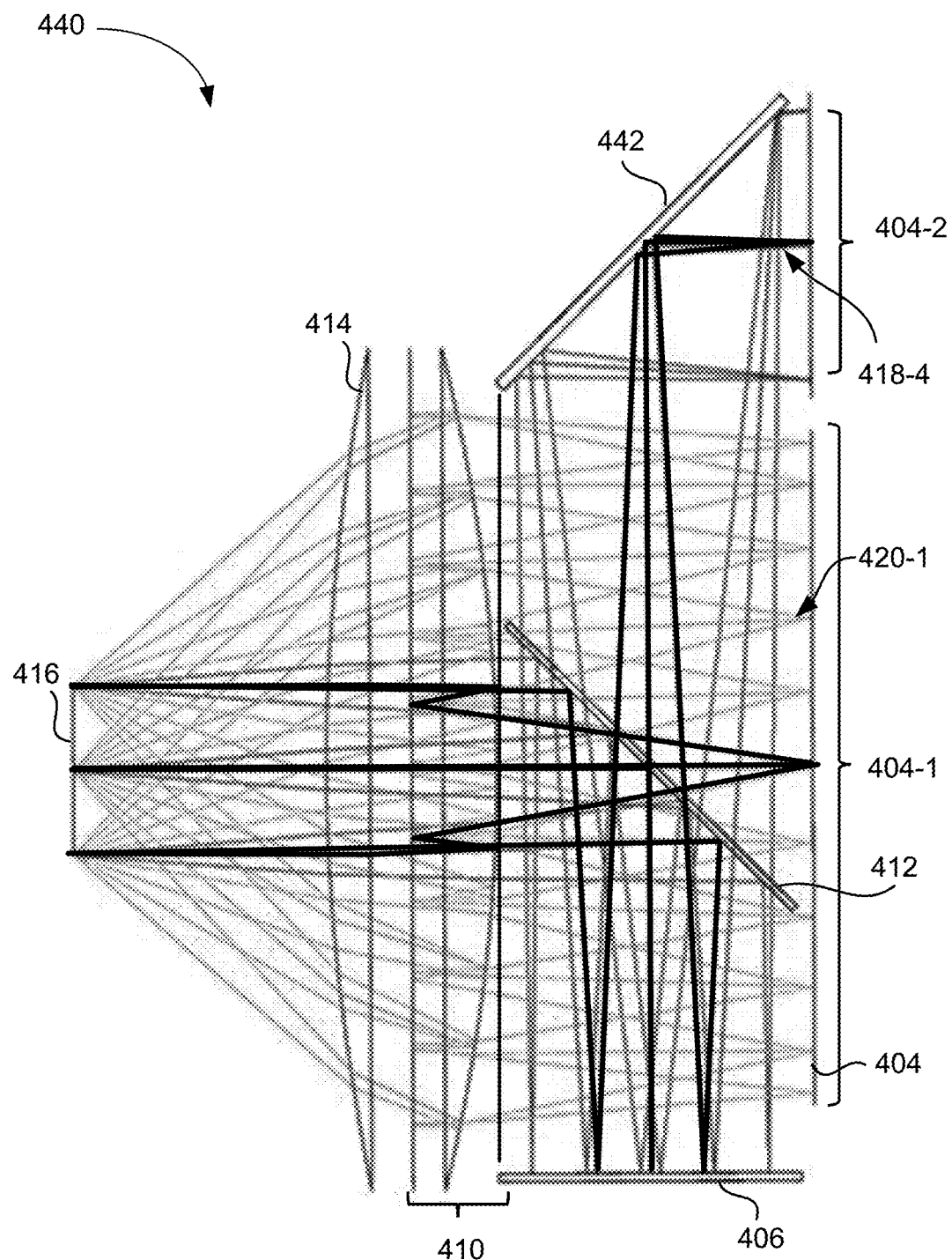
FIG. 4G is a schematic illustration of the display device of FIG. 4F in accordance with some embodiments.

FIG. 4G is a schematic illustration of display device 440 in accordance with some embodiments. FIG. 4G further illustrates optical paths of light 420-1 and light 418-4 projected by portion 404-1 and portion 404-2 of display 404, respectively.

Figure 4H:
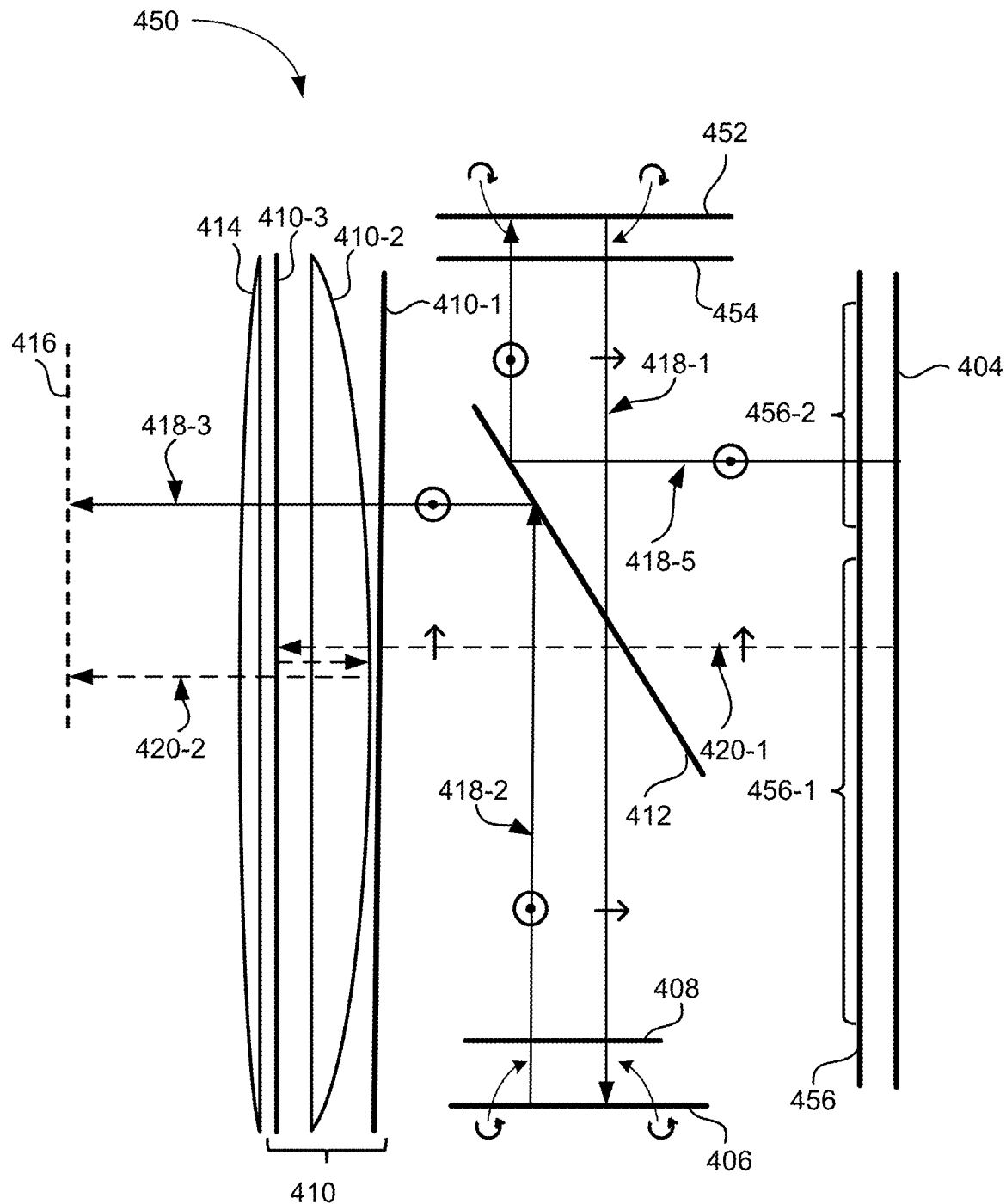
FIG. 4H is a schematic illustration of a display device in accordance with some embodiments.

FIG. 4H is a schematic illustration of display device 450 in accordance with some embodiments. Display device 450 corresponds to display device 400 described above with respect to FIG. 4A, except that, for example, display device 450 does not include display 402, and display 404 is optically coupled with polarization plate 456. In some embodiments, polarization plate 456 (e.g., a half-wave plate) is a switchable polarization plate. In some embodiments, a switchable polarization plate is configured to have first and second operative modes. In the first operative mode, the polarization plate transmits light with a first linear polarization without changing the polarization. and when in the second operative mode, the polarization plate transmits light with the first linear polarization and concurrently acts as a half-wave plate converting the first linear polarization to a second linear polarization orthogonal to the first linear polarization. In some embodiments, polarization plate 456 sequentially switches between the first operative mode and the second operative mode so that light 420-1 having the first linear polarization and light 418-5 having the second linear polarization are projected alternatingly toward reflector 412. The sequential switching between the two polarizations is performed with a suitable frequency so that an image produced by light 420-1 and light 418-1 appears as a uniform image, shown below with respect to FIG. 4P. Light 420-1 having the first linear polarization is transmitted through reflector 412 and refracted by lens assembly 410 as light 420-2 as described above with respect to FIG. 4A. Light 418-5 having the second linear polarization is reflected from reflector 412 toward reflector 452. Reflector 412 reflects light 418-5 toward polarization plate 454 (e.g., a quarter-wave plate), positioned between reflector 412 and reflector 452 (e.g., a mirror). In some embodiments, reflector 452 is a flat reflector configured to reflect light 418-1 toward reflector 412. In some embodiments, reflector 452 is a curved reflector configured to reflect and direct (e.g., focus or defocus) light 418-1 toward reflector 412. While travelling from reflector 412 to reflector 452 and back, light 418-5 passes through polarization plate 454 twice. Polarization plate 454 is configured to change polarization of light 418-5 so that when passing through polarization plate 454 before and after being reflected, light 418-5 is converted to light 418-1 with the first linear polarization. As shown in FIG. 4H, polarization plate 454 first changes polarization of light 418-5 from the second linear polarization to the second circular polarization. Polarization plate 454 changes polarization of the light reflected by reflector 452 to the first linear polarization such that light 418-1, output from polarization plate 454 and incident on reflector 412, has the first linear polarization. Reflector 412 is configured to transmit light 418-1, having the first linear polarization, toward reflector 406. Polarization plate 408 changes polarization of light 418-1 from the first linear polarization to the second circular polarization. Reflector 406 reflects the light back towards reflector 412 and polarization plate changes the polarization of the light to the first linear polarization such that light 418-2, output from polarization plate 408 and incident on reflector 412, has the second linear polarization.

In some embodiments, instead of switching between two different states, polarization plate 456 is a patterned polarization plate including regions 456-1 and 456-2. Regions 456-1 and 456-2 are configured to convert light projected by display 404 so that lights passing through regions 456-1 and 456-2 have opposite linear polarization. In some embodiments, the light projected by display 404 has the first linear polarization and region 456-1 is configured to transmit the light as light 420-1 without changing its polarization and portion 456-2 is configured to transmit the light as light 418-5 by changing its polarization so that light 418-5 has the second linear polarization. Alternatively, the light projected by display 404 has the second linear polarization and portion 456-1 is configured to transmit the light as light 420-1 and changing its polarization so that light 420-1 has the first linear polarization and portion 456-2 is configured to transmit the light as light 418-5 without changing its polarization.

Figure 4I:
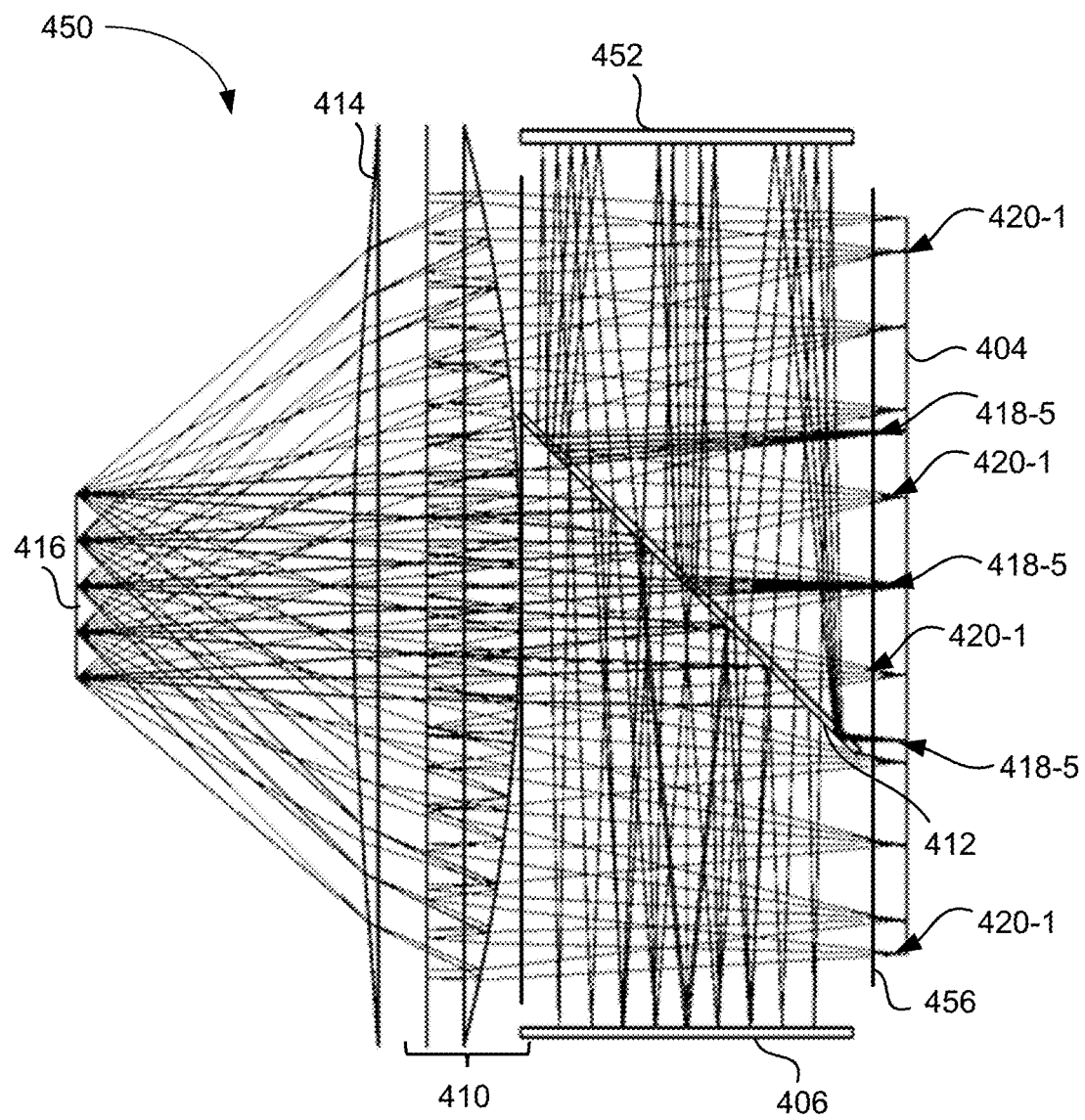
FIG. 4I is a schematic illustration of the display device of FIG. 4H in accordance with some embodiments.

FIG. 4I is a schematic illustration of display device 450 in accordance with some embodiments. FIG. 4I further illustrates optical paths of light 420-1 and light 418-5 projected by display 404 through polarization plate 456 which is switchable polarization plate configured to sequentially switch between the first operative mode and the second operative mode, as described above with respect to FIG. 4H. As a result, light 420-1 and light 418-5 are alternatingly transmitted by the polarization plate 456 and projected toward reference place 416 via their respective optical paths.

Figure 4J:
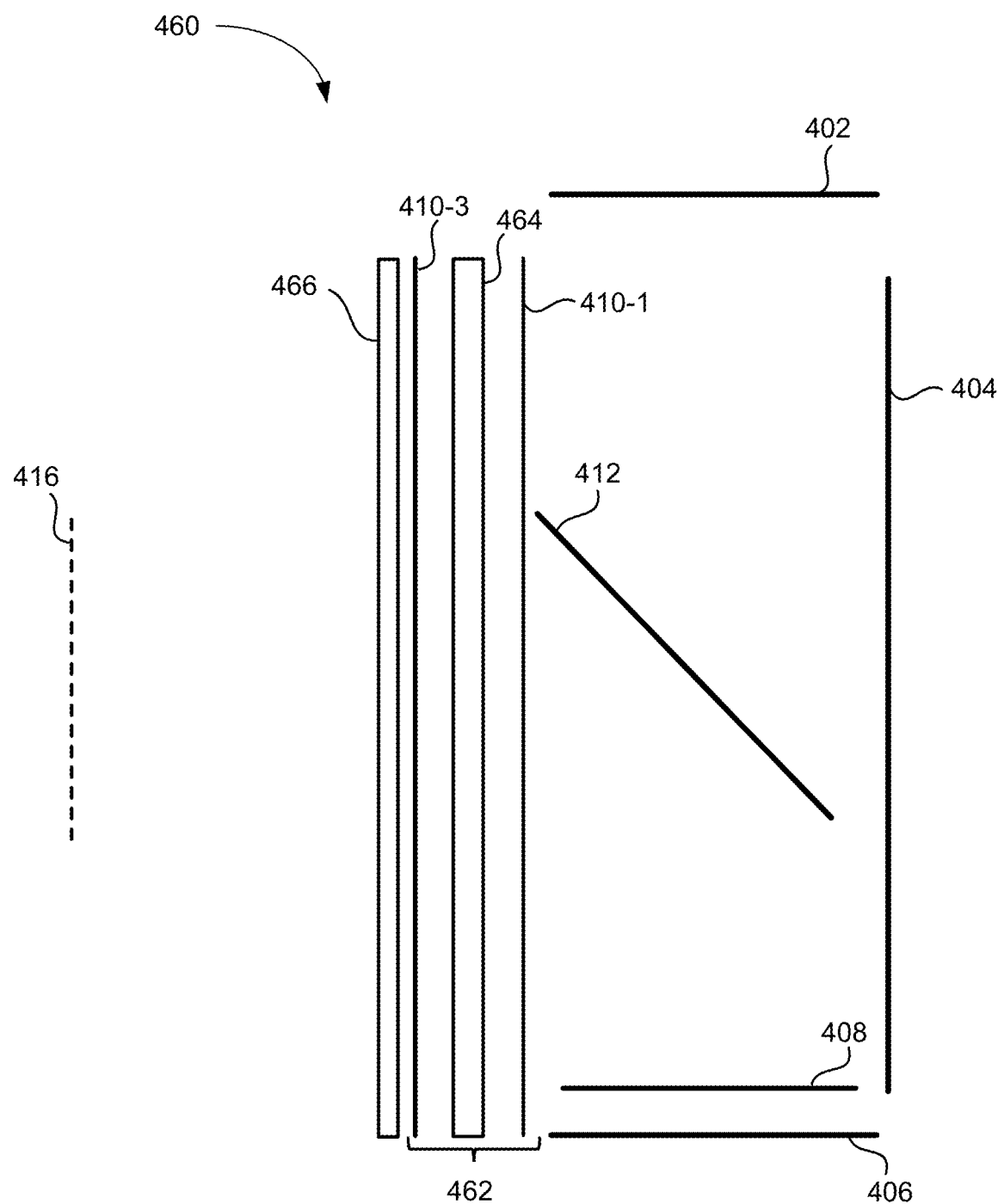
FIG. 4J is a schematic illustration of a display device in accordance with some embodiments.

FIG. 4J is a schematic illustration of display device 460 in accordance with some embodiments. Display device 460 corresponds to display device 400 described above with respect to FIG. 4A, except that, for example, display device 460 includes lens assembly 464 including reflector 464 having a flat shape. In some embodiments, display device 460 also includes one or more lenses 466 corresponding to one or more lenses 414 of FIG. 4A, except that lens 466 is a flat lens. In some embodiments, a flat lens is a liquid crystal lens, a holographic lens, polarization volume hologram lens, a geometric phase lens, a lens made of a metamaterial, a graphite oxide lens or any other type of a flat lens.

Figure 4K:
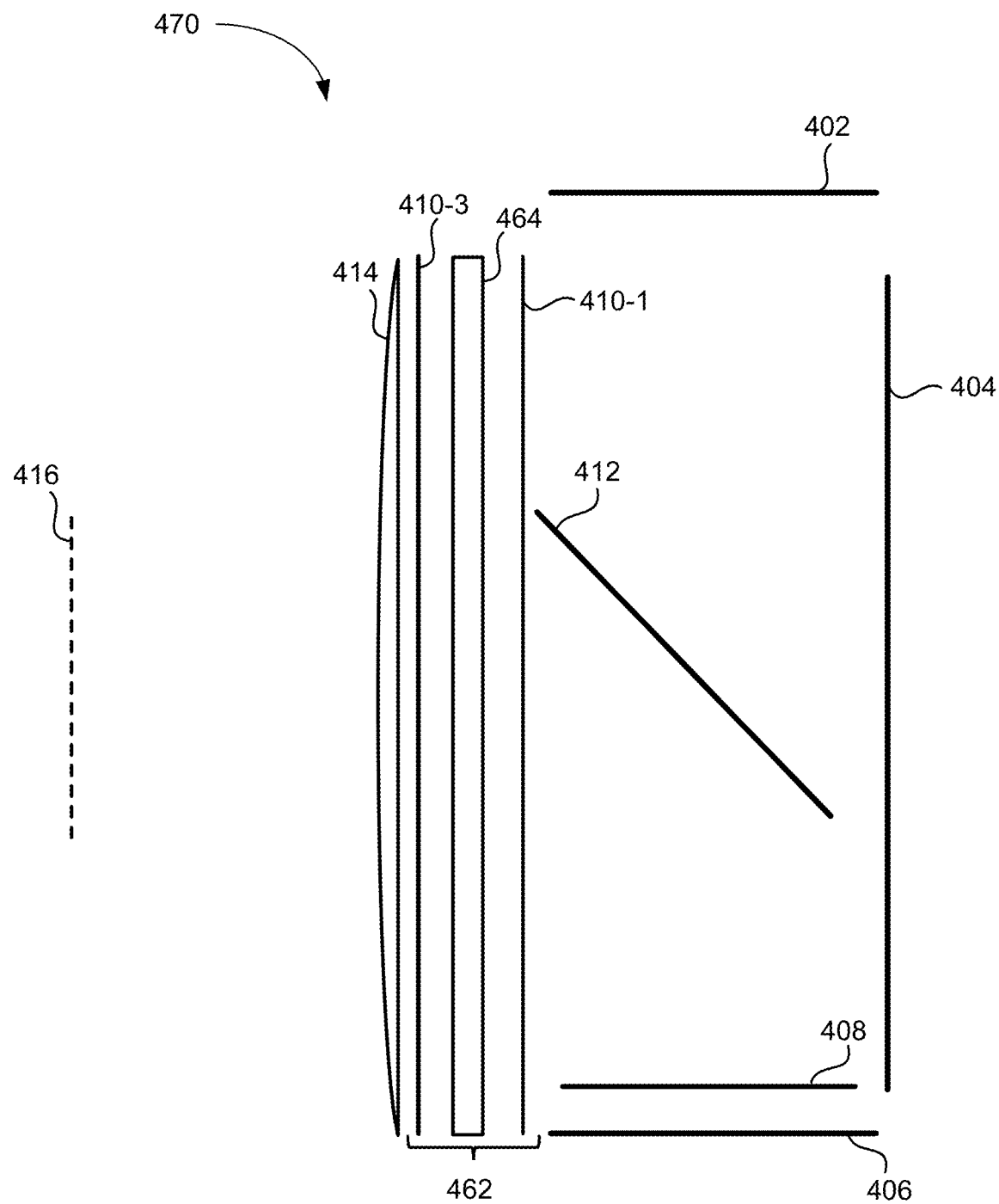
FIG. 4K is a schematic illustration of a display device in accordance with some embodiments.
Figure 4L:
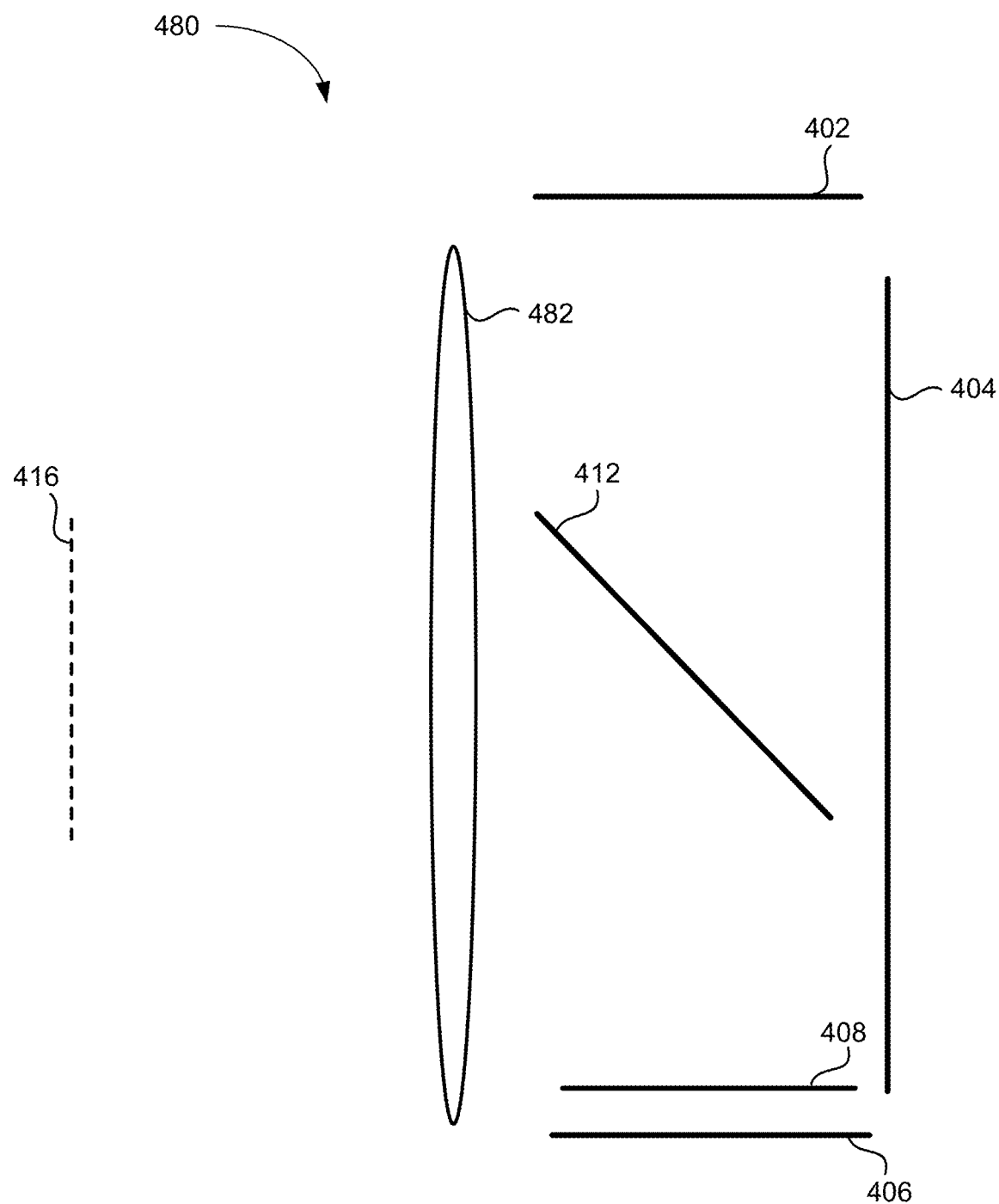
FIG. 4L is a schematic illustration of a display device in accordance with some embodiments.

FIG. 4K is a schematic illustration of display device 470 in accordance with some embodiments. Display device 470 corresponds to display device 460 described above with respect to FIG. 4J, except that, for example, display device 470 includes lens 414 described above with respect to FIG. 4A. FIG. 4L is a schematic illustration of display device 480 in accordance with some embodiments. Display device 480 corresponds to display device 400 described above with respect to FIG. 4A, except that, for example, display device 480 includes one or more lenses 482. In some embodiments, one or more lenses 482 form a lens assembly. One or more lenses 482 are configured to transmit light projected by displays 404 and 402 onto reference plane 416. In some embodiments, one or more lenses 482 are convex-convex lenses, convex-concave lenses, plano-convex lenses, spherical or aspherical lenses, or a combination of one or more of such lenses.

FIGS. 4M and 4N are schematic illustrations of the display device of FIG. 4A in accordance with some embodiments. FIG. 4M illustrates operation of display device 400 when display 402 is inactive. It is noted that this is not the intended mode of operation of display device 400 but is described herein in order to clearly show the function of display 402. Referring to FIG. 4M, display 404 outputs light corresponding to one or more images that are displayed to an eye of a user (e.g., pupil 350 or eye 340 and/or eyebox 416). Light 420-1 corresponds to a portion of the one or more images that is in a peripheral region of the user's field of view and light 420-1' corresponds to a portion of the one or more images that is in a center region of the user's field of view. In such cases, the one or more images displayed by light 420-1 and 420-1' correspond to the same image, have the same resolution (as perceived by the user), and has the same magnification.

FIG. 4N illustrates operation of display device 400 when display 402 is active. In such cases, display 404 outputs light 420-1, not shown, corresponding to a portion of the one or more images that is in a peripheral region of the user's field of view. Additionally, display 402 outputs light 418-1, corresponding to the one or more images that is in a center region of the user's field of view. Thus the central region of a user's field of view, previously illuminated by light 420-2', is now illuminated by light 418-1. In such cases, the one or more images displayed by light 4201-1 and 418-1 correspond to the same image but do not have the same resolution (as perceived by the user) and have different magnifications. Compared to FIG. 4M, the central portion of the one or more images, shown to be displayed by light 4201-1' emitted from display 404 in Figure M, are now displayed by light 418-1 emitted from display 402.

Figure 4O:
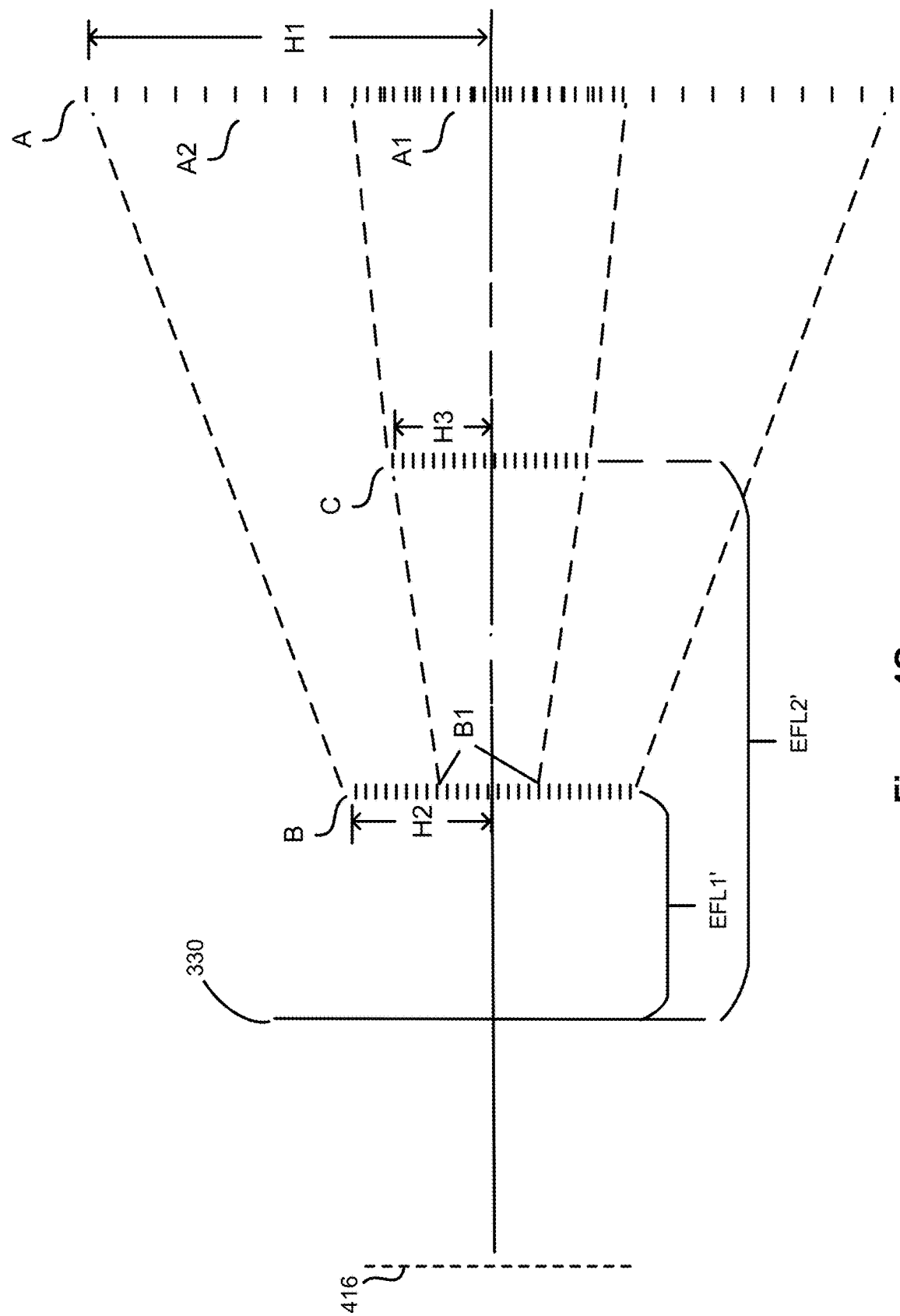
FIG. 4O is a schematic diagram illustrating magnification rates in a display device.

FIG. 4O is a schematic diagram illustrating magnification rates in a display device (e.g., display device 400 described with respect to FIG. 4A). In some embodiments, display image A corresponds to a portion of an image projected to an eyebox 416 of a user by optical assembly 330. Display image A includes a high resolution ($R_{high}$) portion A1 overlapping with and/or surrounded by a low resolution ($R_{low}$) portion A2. The low resolution portion A2 corresponds to an image B displayed by display 404 and projected by optical assembly 330 with an effective focal length EFL1'. The high-resolution image portion A1 corresponds to image C displayed by display 402 and projected with effective focal length EFL2' by display 402. In some embodiments, displays 402 and 404 display respective images B and C with resolution $R_1$ defined as, for example, pixels per inch (PPI) (e.g., displays 402 and 404 are LCDs with a same display PPI). As shown in FIG. 4O, image C corresponds to a portion B1 of image B and is larger in size than the image portion B1. Thus, image C has a larger number of pixels than the number of pixels in image portion B1. As a result, image portion A1 has a higher resolution than image portion A2. In some embodiments, image portion A2 projected with a shorter effective focal length (EFL1'<EFL2') from image B has magnification rate (i.e., magnification) $M_1 = M_A/M_B$, where $M_A$ refers to size of display image A, which can be proportional to an image height H1 of image A, and $M_B$ refers to size of image B, which can be proportional to an image height H2 of image B. Image portion A1 projected with a longer effective focal length EFL2' from image C has magnification rate $M_2 = M_A/M_C$, where $M_C$ refers to size of image C, which can be proportional to an image height H3 of image C. Because EFL1'<EFL2', magnification rate $M_1 > M_2$.

Display image projected by a display device 400 may include different configurations and sizes of high and low resolution portions, from those illustrated in the schematic diagram of FIG. 4O.

Figure 4P:
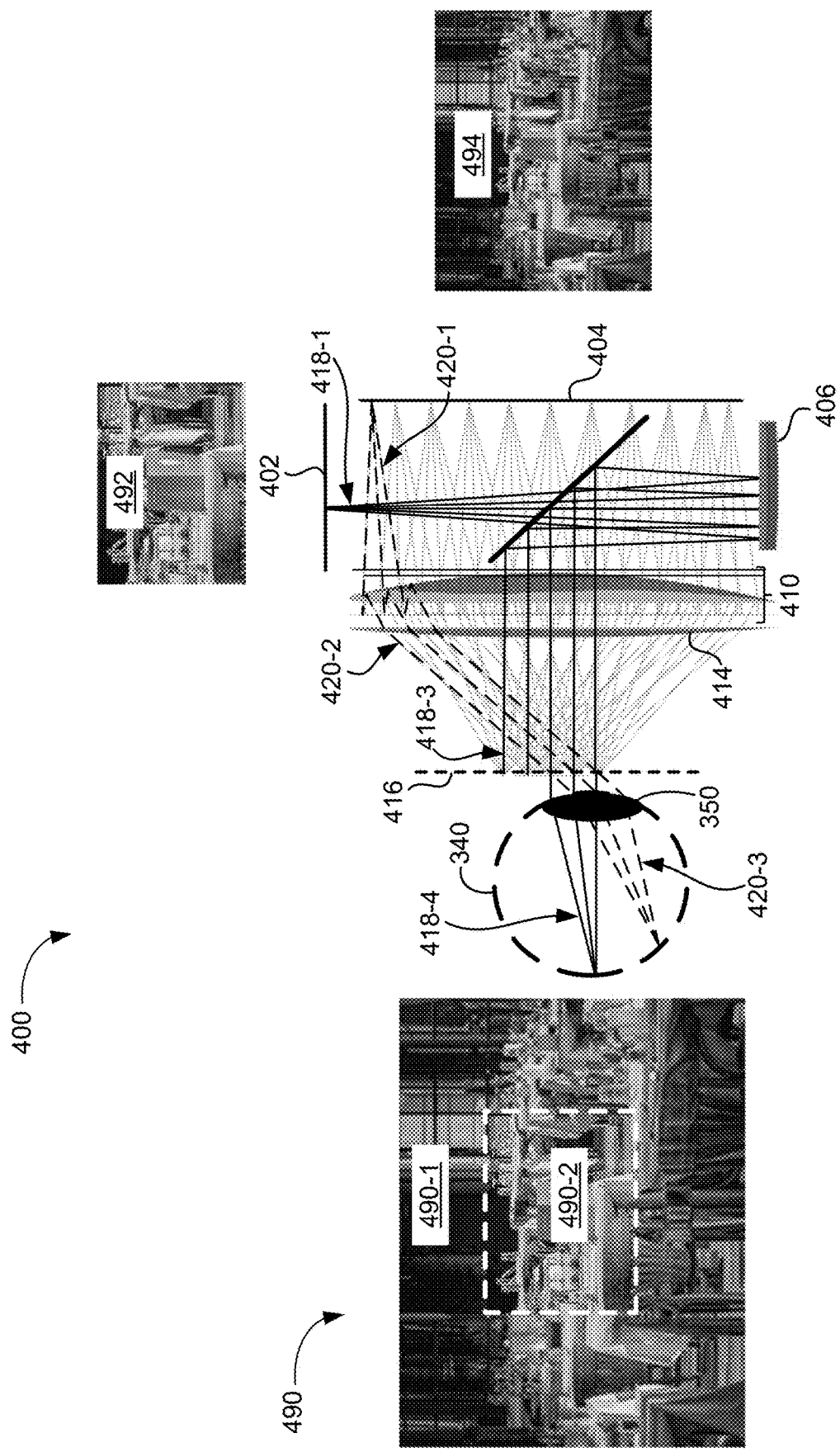
FIG. 4P illustrates an exemplary example of an image displayed by the display device of FIG. 4A in accordance with some embodiments.

FIG. 4P illustrates an exemplary example of an image displayed by the display device (e.g., display device 400) of FIG. 4A in accordance with some embodiments. As shown in FIG. 4P, display 404 emits image light (e.g., light 420-1) corresponding to image 494, which is projected by display device 400 as at least a peripheral region (e.g., region 490-1) of an image (e.g., display image 490). Display 402 concurrently emits image light (e.g., light 418-1) corresponding to image 492, which is projected by display device 400 as a central region (e.g., region 490-2) of the same image (e.g., image 490). As a result, a user of display device 400 perceives display image 490 as having the central portion 490-2, corresponding to image 492, that has a higher resolution than the periphery portion 490-1, corresponding to a corresponding part of image 494. The white border around central region 490-2 of display image 490 is shown for illustrative purposes only, to show the two regions of the image, as perceived by the user. In order to ensure that the projected display image 490 is not distorted, image 492 is larger in size compared to the corresponding portion in image 494. Thus, a size ratio between the two portions 490-1 and 490-2 are predetermined based on the size ratio between the two displays 402 and 404 and the configuration of the optical assembly 330, in order to avoid distortion of the projected display image 490, perceived by the user. In order to achieve smooth, minimally visible blending between the high resolution central portion 490-2 and low resolution peripheral portion 490-1, the image intensities of image 492 and image 494 may be spatially varied. In one embodiment, a central area of image 494 may be gradually darkened in the region corresponding to image 492.

Figure 5:
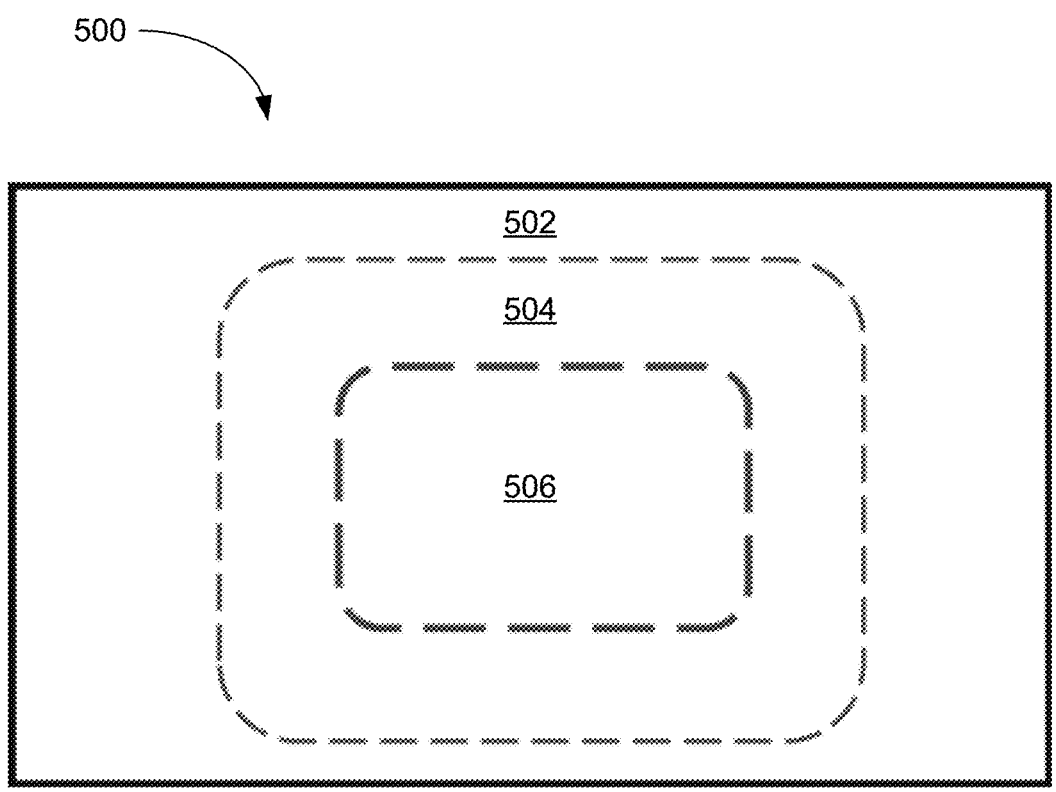
FIG. 5 is a schematic illustration of a patterned waveplate in accordance with some embodiments.

FIG. 5 is a schematic illustration of patterned waveplate 500 in accordance with some embodiments. In some embodiments, patterned waveplate 500 corresponds to polarization waveplate 456 described above with respect to FIG. 4H. Patterned waveplate 500 includes two or more regions (e.g., regions 502 and 506) configured to convert light passing through patterned waveplate 500 (e.g., light projected by display 404 in FIG. 4H) so that light passing through regions 502 and 506 have opposite linear polarizations. In some embodiments, region 502 corresponds to region 456-2 in FIG. 4H configured to transmit light 420-1 having the first linear polarization and region 506 corresponds to region 456-1 configured to transmit light 418-5 having the second linear polarization. In some embodiments, region 502 is located around region 506. In some embodiments, region 502 is adjacent to, and extending from, region 506. In some embodiments, patterned waveplate 500 further includes region 504 located around region 506 and being surrounded by region 502. Region 504 includes a switchable polarization plate region corresponding to a switchable polarization plate described above with respect to FIG. 4H. Region 504 is configured to transmit either of light 418-1 or light 420-1 by switching its operative mode. Region 504 is therefore configured to either provide light 418-1 corresponding to light transmitted by region 502 or light 420-1 corresponding to light transmitted by region 506. By alternating the operative mode of region 504, the size of the region displayed with an enhanced resolution corresponding to light 118-1 can be changed.

Figure 6A:
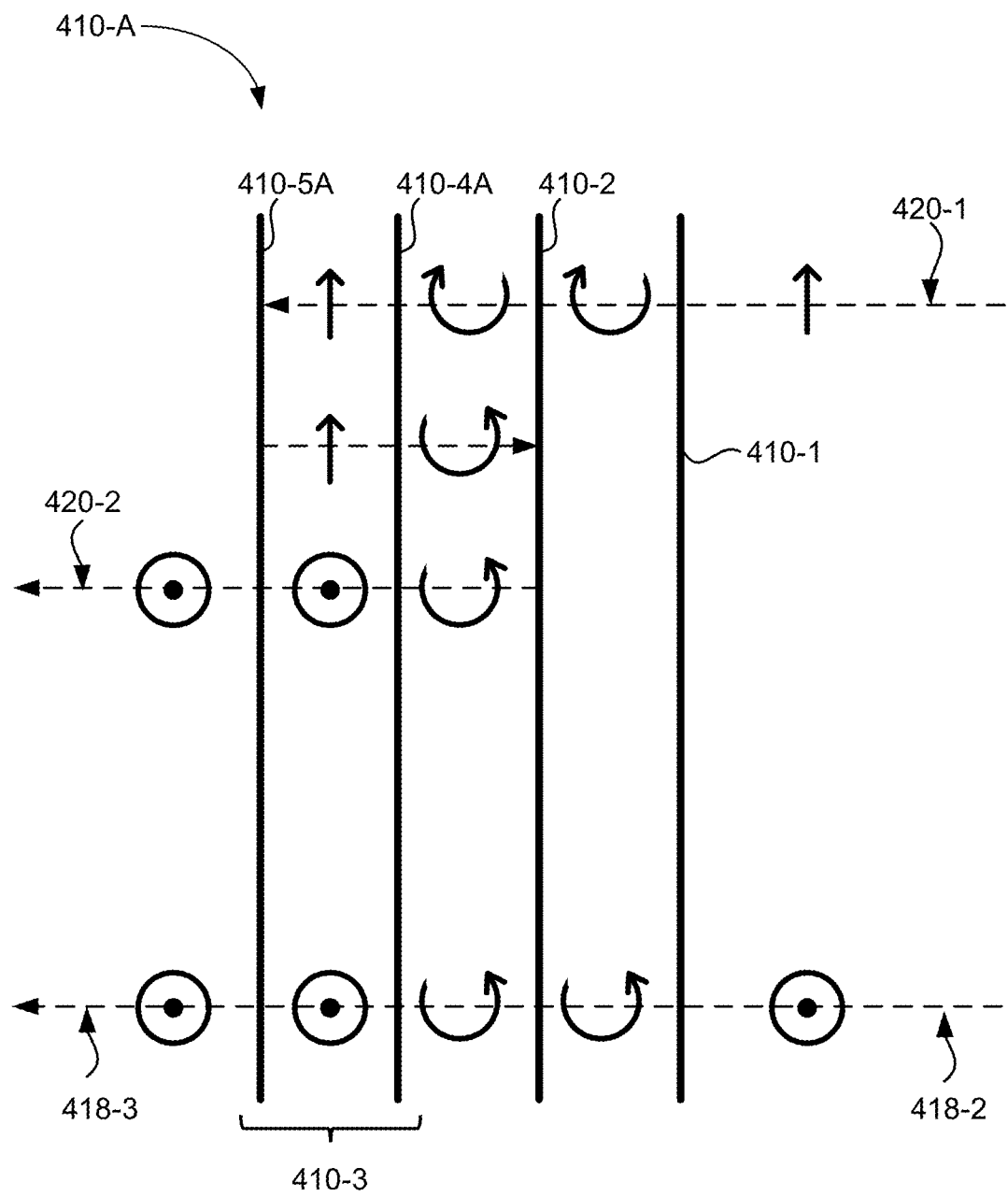
FIG. 6A is a schematic illustration of a lens assembly in accordance with some embodiments.

FIG. 6A is a schematic illustration of lens assembly 410-A in accordance with some embodiments. It is noted that directions of polarizations are indicated with respect to direction of a respective light in FIGS. 6A and 6B. Lens assembly 410-A corresponds to lens assembly 410 described above with respect to FIG. 4A. Lens assembly includes polarization plate 410-1, reflector 410-2, polarization plate 410-4A and reflective polarizer 410-5A. In some embodiments, polarization plate 410-4A and reflective polarizer 410-5A are combined to a single optical element (e.g., optical element 410-3). In FIG. 6A, polarization plate 410-1 is a quarter-wave plate configured to receive and transmit light 420-1 having the first linear polarization and convert polarization of light 420-1 from the first linear polarization to a first circularly polarized light. In some embodiments, partial mirror 410-2 is a 50:50 mirror. Partial mirror 410-2 is configured to transmit a portion of light 420-1 having the first circularly polarized light without changing its polarization. In FIG. 6A, polarization plate 410-4A is a quarter-wave plate. In some embodiments, polarization plate 410-4A is clocked by 90 degrees from polarization plate 410-1 thereby compensating for the polarization conversion resulting from polarization plate 410-1. Polarization plate 410-4A is thereby configured to receive and transmit light 420-1 with the first circular polarization and convert polarization of light 420-1 from the first circular polarization back to the first linear polarization. In FIG. 6A, reflective polarizer 410-5A is configured to reflect light having the first linear polarization and transmit light having the second linear polarization. Reflective polarizer 410-5A reflects light 420-1 back toward polarization plate 410-4A without changing the polarization. Polarization plate 410-4A receives and transmits light 410-1 having the first linear polarization and converts the polarization of light 410-1 back to the first circular polarization. Light 420-1 is then received and reflected by partial mirror 410-2 as light 410-1 having a second circular polarization orthogonal to the first circular polarization. Light 410-1 with the second circular polarization is then received and transmitted by polarization plate 410-4A and converted to light 420-2 having the second linear polarization. Light 420-2 is then transmitted by reflective polarizer 410-5A. Lens assembly 410-A therefore acts on light 420-1 with two reflections (from reflective polarizer 410-5A and partial reflector 410-2). Curvature on a reflecting surface (e.g. partial reflector 410-2) imparts significant optical power on the ray. Lens assembly 410-A is therefore configured to act with short focal length (high magnification) on ray 420-1 compared to a conventional lens (refractive surfaces only) of the same shape factor.

Polarization plate 410-1 is also configured to receive and transmit light 418-2 having the second linear polarization and converting the polarization of light 418-2 from the second linear polarization to the second circular polarization. A portion of light 418-2 with the second circular polarization is transmitted through partial mirror 410-2 and is received and transmitted by polarization plate 410-4A. Polarization plate 410-4A transmits light 418-2 as light 418-3 concurrently converting the polarization of light 418-2 to the second linear polarization, which is then transmitted through reflective polarizer 410-5A. Lens assembly 410-A therefore acts on ray 418-2 with less optical power than ray 420-1.

Figure 6B:
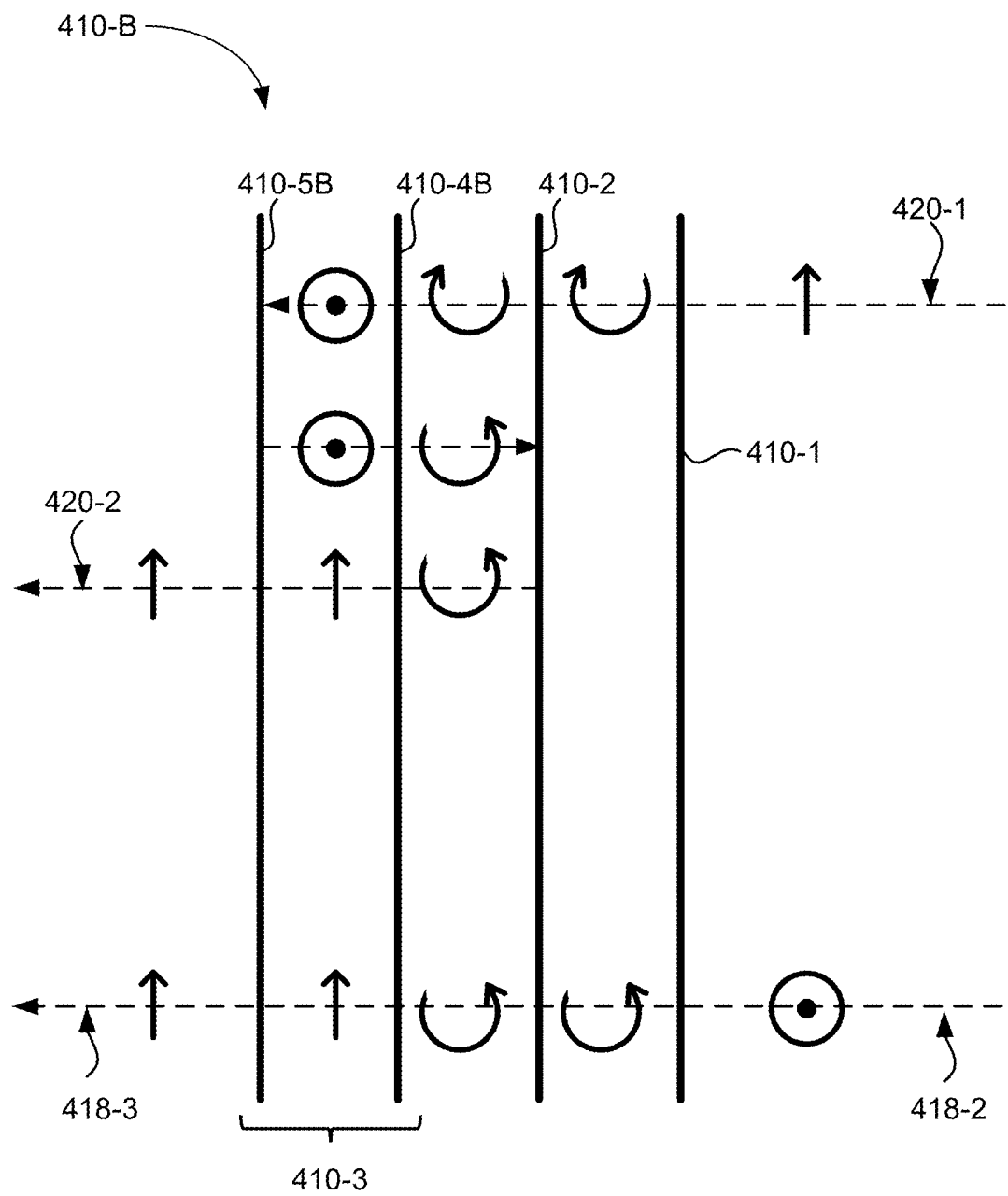
FIG. 6B is a schematic illustration of a lens assembly in accordance with some embodiments.

FIG. 6B is a schematic illustration of lens assembly 410-B in accordance with some embodiments. Lens assembly 410-B corresponds to lens assembly 410-A described above with respect to FIG. 6A except that polarization plate 410-4B is a quarter-wave plate corresponding to polarization plate 410-1. Polarization plate 410-4B therefore converts polarization of light having the first circular polarization to light having the second linear polarization. In FIG. 6B, reflective polarizer 410-5B is configured to reflect light having the second linear polarization and transmit light having the first linear polarization (e.g., light 418-3 and light 420-2 having the first linear polarization are transmitted by reflective polarizer 410-5B). Lens assembly 410-B is configured to output light 418-3 having the first linear polarization and light 420-2 having the first linear polarization.

Figure 7A:
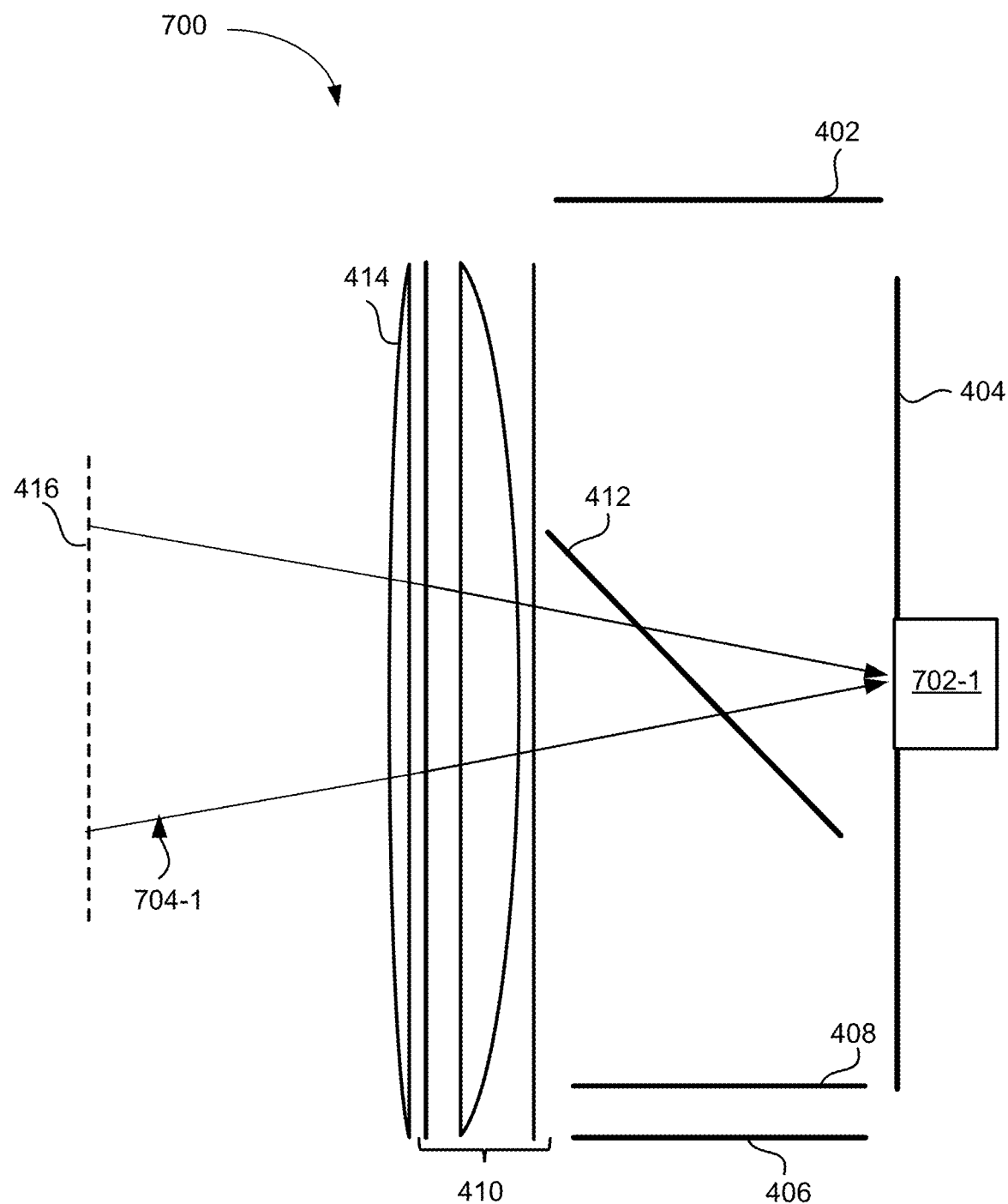
FIG. 7A is a schematic illustration of a display device including a detector for eye-tracking in accordance with some embodiments.

FIG. 7A is a schematic illustration of display device 700 including detector 702-1 for eye tracking in accordance with some embodiments. Display device 700 corresponds to display device 400 (e.g., a head-mounted display device) described above with respect to FIG. 4A, except that display device 700 additionally includes detector 702-1. In some embodiments, detector 702-1 is a camera (e.g., a still camera or a video camera). In some embodiments, detector 702-1 is further coupled with one or more lenses and/or other optical components. Detector 702-1 is configured to receive light 704-1 reflected from a surface of an eye of a user of display device 700. In some embodiments, light 704-1 is IR or NIR light and thereby not visible to the user. Lens assembly 410, reflector 412 and optionally lens 414 are configured to transmit light 704-1 from reference plane 416 to detector 702-1. In some embodiments, detector 702-1 is coupled with, or included in, eye tracking module 217 described above with respect to FIG. 2. In some embodiments, detector 702-1 corresponds to an IR detector array configured to detect a position of pupil 350 of eye 340 described above with respect to FIG. 3. In FIG. 7A, detector 702-1 is coupled with or adjacent to display 404. In some embodiments, detector 702-1 is positioned above display 404 when display device 700 is worn by a user.

Figure 7B:
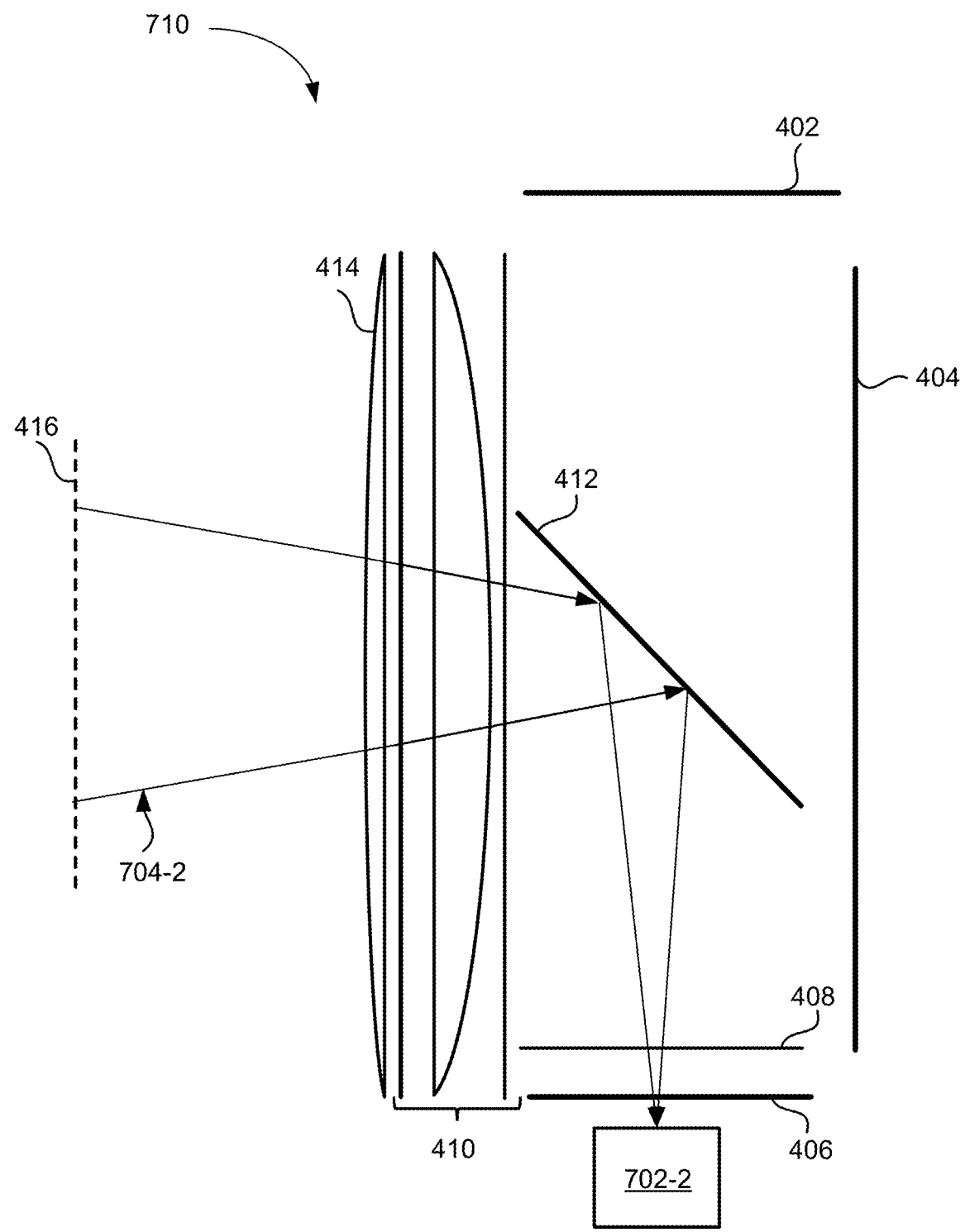
FIG. 7B is a schematic illustration of a display device including a detector for eye-tracking in accordance with some embodiments.

FIG. 7B is a schematic illustration of display 710 device including detector 702-1 for eye tracking in accordance with some embodiments. Display device 710 corresponds to display device 700 described above with respect to FIG. 7A, except that display device 710 includes detector 702-2 optically coupled with reflector 406. In FIG. 7B, reflector 406 is a cold mirror configured to transmit light in the infrared wavelength range, such as light 704-2 reflected from a surface of an eye of a user on display device 710 while reflecting visible light (e.g., light 718-1 in FIG. 4A) projected by display 402. In some embodiments, detector 702-2 is coupled with, or adjacent to, reflector 406. In some embodiments, detector 702-2 is positioned separate from reflector 406.

Figure 8A:
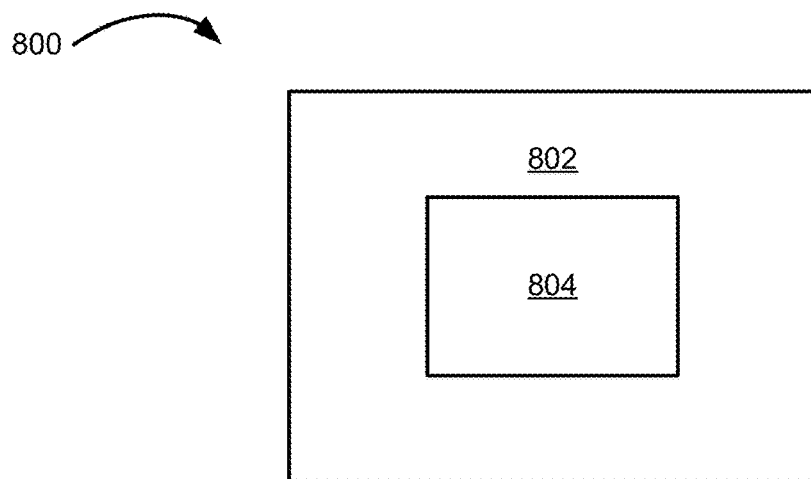
FIG. 8A is a schematic illustration of an image displayed by a display device in accordance with some embodiments.
Figure 8B:
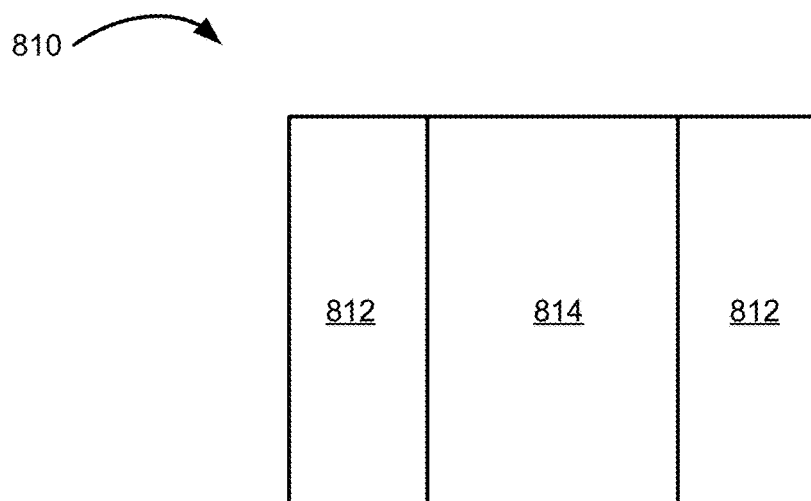
FIG. 8B is a schematic illustration of an image displayed by a display device in accordance with some embodiments.

FIG. 8A is a schematic illustration of image 800 displayed by a display device in accordance with some embodiments. In some embodiments, image 800 is an image projected by display device 400 in FIG. 4A. Image 800 of FIG. 8A includes region 802 and region 804. Region 802 is located around image 804. Region 804 corresponds to a region of an enhanced resolution using light 418-3 from display 402, as shown in FIG. 4A. Because light 418-3 has a longer optical path than light 420-2 from display 404, an image projected onto region 804 has a higher resolution (e.g., as explained above with respect to FIG. 4P). In some embodiments, region 804 is also illuminated by light 420-2 so that the images rendered by light 418-3 and light 420-2 correspond to each other such that the images overlap with each other to provide a suitably blended image. In some embodiments, an image rendered by light 418-3 overlaps with an image rendered by light 420-2. For example, region 804 of image 800 may include light 818-3 output from display 402 as well as a portion of light 420-1 output from display 404. Region 802 corresponds to a region that has a lower image resolution than region 804. Region 802 of image 800 is rendered using light 420-2, output from display 404. In some embodiments, region 804 of image 800 is formed only by light 418-3 output from display 402. In such embodiments, light 420-2 is only directed to region 802 or light 420-2 is blocked from illuminating region 804. FIG. 8B is a schematic illustration of image 810 displayed by a display device in accordance with some embodiments. In some embodiments, image 810 corresponds to an image projected on reference plane 416 by display device 400 in FIG. 4A. Image 810 of FIG. 8B includes region 812 and region 814. Region 814 corresponds to region 804 of FIG. 8A and is positioned in the center region and extending along the height of image 810. Region 812 corresponds to region 802 of FIG. 8A and extends from both sides of region 812 toward the edges of image 810.

Figure 8C:
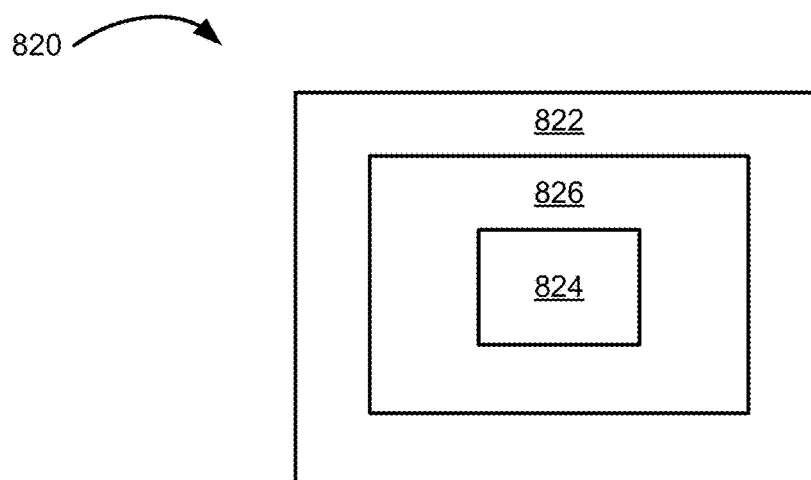
FIG. 8C is a schematic illustration of an image displayed by a display device in accordance with some embodiments.

FIG. 8C is a schematic illustration of image 820 displayed by a display device in accordance with some embodiments. In some embodiments, image 820 corresponds to an image projected by display device 400 in FIG. 4A. Region 822 corresponds to region 802 of FIG. 8A and region 824 corresponds to region 804 of FIG. 8A. Image 820 optionally includes region 826 corresponding to a switchable area that may correspond to either of the regions 822 or 824 based on operative mode of region 504 of patterned polarization plate 500 described above with respect to FIG. 5.

Figure 8D:
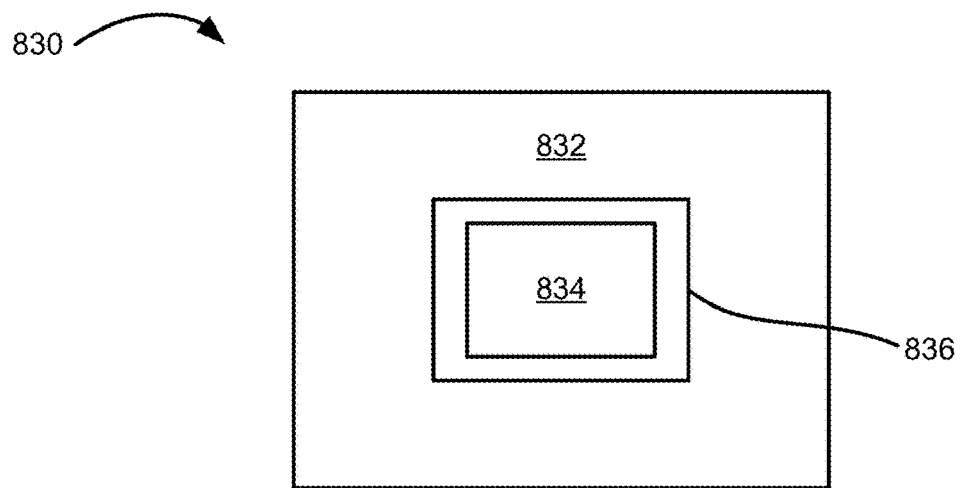
FIG. 8D is a schematic illustration of an image displayed by a display device in accordance with some embodiments.

FIG. 8D is a schematic illustration of image 830 displayed by a display device in accordance with some embodiments. Image 830 corresponds to image 800 described above with respect to FIG. 8A, except that image 830 has been modified to increase uniformity across image 830. In FIG. 8A, region 804 corresponding to an enhanced resolution area of image 800 has a higher resolution than region 802. However, an abrupt transition between the two different resolutions may be visible to a user of a display device, thereby decreasing overall image quality. Therefore, in some embodiments, the resolution of part of image 830 is modified to create a smooth transition from region 802 to region 804. In FIG. 8D, region 832 corresponds to region 802 and region 834 corresponds to region 804. In addition, image 830 includes transition region 836 between region 832 and region 834. In some embodiments, region 836 is a portion of an image rendered by light 418-3 in FIG. 4A, and is further modified to have an image resolution that is between the image resolution of region 834 and the image resolution of region 832. In some embodiments, image resolution of region 836 is modified by pixel binning. In some embodiments, region 836 has a constant image resolution that is lower than the image resolution of region 834 and higher than image resolution of region 832. In some embodiments, region 836 has a resolution that changes gradually or stepwise so that the resolution of region 836 near region 834 is higher and decreases toward region 832.

Figure 8E:
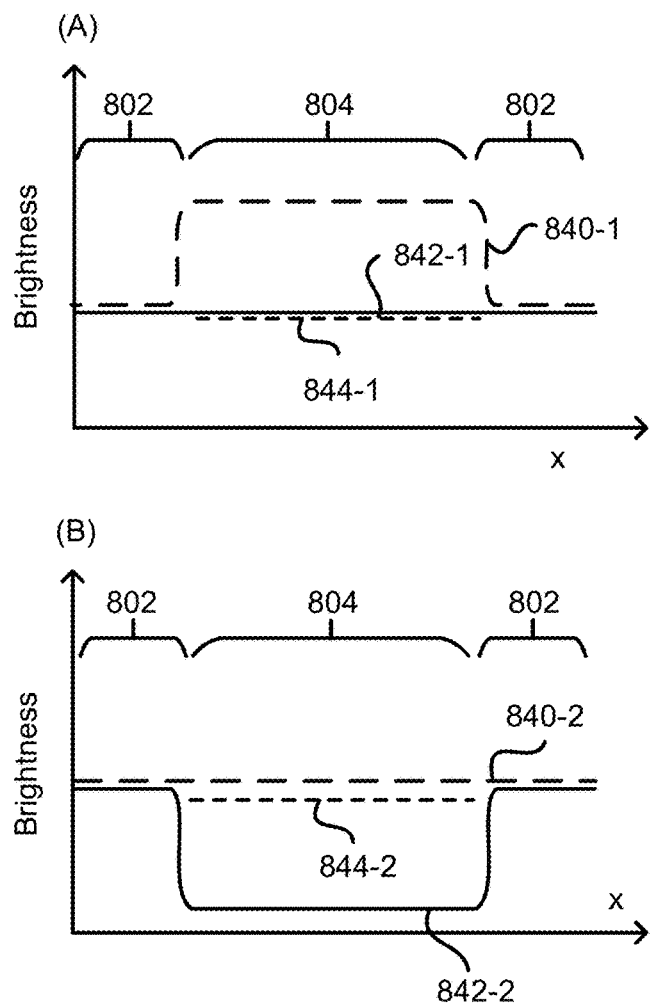
FIG. 8E is a graphical illustration of image brightness in accordance with some embodiments.

FIG. 8E is a graphical illustration image brightness in accordance with some embodiments. Section (A) of FIG. 8E is a graphical illustration of image brightness across image 800 (e.g., regions 802 and 804) described above with respect to FIG. 8A. Line 840-1 corresponds to image brightness of image 800, which is the sum of image brightness 842-1 contributed by image light from display 404 and image brightness 844-1 contributed by image light from display 402. In the incidence described in Section (A), image rendered with light from display 402 overlaps image rendered with light from display 404. As a result, as shown in Section (A) of FIG. 8E, the overall image brightness illustrated by line 840-1 is abruptly changed at the intersection of regions 802 and 804. Such change in the image brightness may be observable to a user of a display device, thereby decreasing image quality. Therefore, in some embodiments, the image brightness of region 802 and/or region 804 is modified to create a smooth transition from region 802 to region 804. In Section (B), line 840-2 corresponds to image brightness of image 800, which is the sum of image brightness 842-2 contributed by image light from display 404 and image brightness 844-2 contributed by image light from display 402. As in section (A), image rendered with light from display 402 overlaps image rendered with light from display 404. However, in Section (B), the image brightness 842-2 contributed by display 404 is reduced in an area corresponding to region 804 (i.e., a central area), so that the overall image brightness illustrated by line 840-2 remains constant, or nearly constant, across regions 802 and 804. In some embodiments, the image brightness is modified by adjusting pixel intensity of displays (e.g., display 402 and/or display 404 in FIG. 4A). For example, display 404 in FIG. 4A includes an array of light emitting devices (e.g., display 404 is a LCD), and the pixel intensity of display 404 is adjusted by dimming or blocking a portion of the array of light emitting devices corresponding to light projected onto region 404.

In light of these principles, we now turn to certain embodiments of display devices.

In accordance with some embodiments, a display device includes a first display, a second display and one or more optical elements (e.g., display device 400 includes display 404, display 402 and other optical elements in FIG. 4A). The first display is configured to provide first light that corresponds to a first image (e.g., light 420-1) and the second display is configured to provide second light that corresponds to a second image (e.g., light 418-1). The one or more optical elements are configured to project a display image using the first light and the second light, the display image including the first image and the second image (e.g., light 420-1 corresponds to central portion 490-2 of display image 490 and light 418-1 corresponds to peripheral portion 490-2 of display image 490 in FIG. 4P). The display device is configured to project the first image with a first magnification and project the second image with a second magnification that is distinct from the first magnification (e.g., image 802 has a first magnification and image 804 has a second magnification in FIG. 8A).

In some embodiments, at least a portion of the first image is projected around the projection of the second image (e.g., portion 490-1 is around portion 490-2 in FIG. 4P). In some embodiments, the first image has a first resolution and the second image has a second resolution, and a difference between the first resolution and the second resolution is significantly greater than a difference between a resolution of the first display and a resolution of the second display.

In some embodiments, the one or more optical elements include a first reflector (e.g., reflector 412 in FIG. 4A), a second reflector (e.g., reflector 406) and a first polarization plate (e.g., polarization plate 408). The first reflector is configured to transmit light having a first polarization and reflect light having a second polarization that is distinct from the first polarization (e.g., reflector 412). The first reflector is also configured to receive, from a first input direction, the first light (e.g., light 420-1), having the first polarization, and receive, from a second input direction that is distinct from the first input direction, the second light (e.g., light 418-1), having the first polarization so that the first light is transmitted through the first reflector and the second light is transmitted through the first reflector. The second reflector is configured to reflect, toward the first reflector, the second light transmitted through the first reflector (e.g., reflector 406 reflects light 418-1 transmitted through reflector 412 back toward reflector 412). The first polarization plate is located between the first reflector and the second reflector (e.g., polarization plate 408 is located between reflector 412 and reflector 406). The first polarization plate is configured to change a polarization of light transmitted through the first polarization plate so that the second light transmitted from the first reflector passes through the first polarization plate toward the second reflector (e.g., polarization plate 408 changes polarization of light 418-1 from the first polarization to the second polarization); the second light, reflected from the second reflector, passes through the first polarization plate toward the first reflector (e.g., light 418-2 is reflected from reflector 406 and has passed through polarization plate 408); the second light that has been reflected from the second reflector and transmitted through the first polarization plate has the second polarization (e.g., light 418-2 has the second polarization); and the first reflector reflects the second light that has been reflected from the second reflector and transmitted through the first polarization plate (e.g., light 418-2 has the second polarization and is reflected by reflector 412). The display device is configured to project the first image and the second image on a common image plane (e.g., reference plane 416).

In some embodiments, the display device is a head-mounted display device (e.g., display device 400 in FIG. 4A corresponds to display device 100 in FIG. 1).

In some embodiments, the display device further includes a lens assembly (e.g., lens assembly 410 in FIG. 4A). The lens assembly includes a second polarization plate (e.g., polarization plate 410-1, such as a quarter-wave plate, in FIG. 6A), a third reflector (e.g., partial mirror 410-2), a third polarization plate (e.g., polarization plate such as a quarter-wave plate 410-4A), and a fourth reflector (e.g., reflective polarizer 410-5A). The second polarization plate is configured to receive, from the first reflector, the first light having the first polarization (e.g., light 420-1 having a first linear polarization) and transmit the first light so that the first light has a third polarization distinct (e.g., a first circular polarization) from the first polarization and the second polarization. The second polarization plate is also configured to receive, from the first reflector, the second light having the second polarization (e.g., light 418-2 having a second linear polarization orthogonal to the first linear polarization) and transmit the second light so that the second light has a fourth polarization (e.g., a second circular polarization) distinct from the first polarization, the second polarization, and the third polarization. The third reflector is configured to receive the first light having the third polarization and cause refraction of a refracted portion of the first light having the third polarization. The third reflector is also configured to receive the second light having the fourth polarization and cause refraction of a refracted portion of the second light having the fourth polarization. The third polarization plate is configured to receive the refracted portion of the first light having the third polarization and transmit the refracted portion of the first light so that the refracted portion of the first light has a fifth polarization (e.g., the fifth polarization corresponds to the first linear polarization in FIG. 6A and to the second linear polarization in FIG. 6B). The third polarization plate is also configured to receive the refracted portion of the second light having the fourth polarization and transmit the refracted portion of the second light so that the refracted portion of the second light has a sixth polarization that is distinct from the fifth polarization (e.g., the sixth polarization corresponds to the second linear polarization in FIG. 6A and to the first linear polarization in FIG. 6B). The fourth reflector is configured to receive the refracted portion of the second light having the sixth polarization and transmit the refracted portion of the second light having the sixth polarization. The fourth reflector is also configured to receive the refracted portion of the first light having the fifth polarization and reflect the refracted portion of the first light having the fifth polarization so that the first light reflected from the fourth reflector passes through the third polarization plate toward the third reflector; a portion of the first light, reflected from the third reflector, passes through the third polarization plate toward the fourth reflector; the portion of the first light that has been reflected from the third reflector and transmitted through the third polarization plate has the sixth polarization; and the fourth reflector transmits the portion of the first light having the sixth polarization.

In some embodiments, the fifth polarization corresponds to the first polarization and the sixth polarization corresponds to the second polarization (e.g., FIG. 6A). In some embodiments, the fifth polarization corresponds to the second polarization and the sixth polarization corresponds to the first polarization (e.g., FIG. 6B). In some embodiments, the fourth reflector of the lens assembly is further optically coupled with a lens, the lens configured to further focus the first light and the second light transmitted by the fourth reflector onto the common image plane (e.g., lens assembly 410 is coupled with lens 414 in FIG. 4A).

In some embodiments, the lens assembly is configured to receive from the first reflector, and focus, the first light and the second light (e.g., FIG. 4A).

In some embodiments, the first image and the second image received by the first reflector have a first image resolution (e.g., displays 402 and 404 have the same pixel resolution and therefore images corresponding to light 418-1 and light 420-1 have the same image resolution in FIG. 4A).

In some embodiments, the first image projected on the common image plane has a second image resolution and the second image projected on the common image plane has a third image resolution distinct from the second image resolution (e.g., a first image corresponding to image light 420-2 and a second image corresponding to light 418-3 in FIG. 4A). In some embodiments, the difference between the second image resolution and the third image resolution is greater than a difference between a display resolution of the first display and a display resolution of the second display. In some embodiments, the second image resolution is distinct from the first image resolution (e.g., the image resolution of light 420-2 is distinct from image resolution of light 420-1). In some embodiments, the third image resolution is distinct from the first image resolution (e.g., the image resolution of light 418-3 is distinct from image resolution of light 418-1). In some embodiments, the second image resolution is higher than the first image resolution (e.g., the image resolution of light 420-2 is higher than image resolution of light 420-1). In some embodiments, the third image resolution is higher than the second image resolution (e.g., the image resolution of light 418-3 is higher than image resolution of light 420-2).

In some embodiments, the first reflector has a first size (e.g., reflector 412 in FIG. 4D) and the first image from the first input direction has a second size distinct from the first size (e.g., an image corresponding to light 420-1 in FIG. 4D). In some embodiments, the first size is smaller than the second size, so that the second image is smaller than the first image. For example, image 800 in FIG. 8A includes portion 802 corresponding to the first image and portion 804 corresponding to the second image, and portion 804 is smaller than portion 802.

In some embodiments, the second reflector is a curved reflector and reflecting the second light transmitted through the first reflector includes focusing the second light (e.g., reflector 406 is curved in FIGS. 4C and 4D).

In some embodiments, the second image projected on the common display image plane at least partially overlaps the first image projected on the common display image plane (e.g., portion 804 overlaps portion 802 in FIG. 8A). In some embodiments, a portion of the first image is blocked so that the second image does not overlap with the first image but the first image extends from the second image or the first image is projected around the second image (e.g., portion 804 does not overlap portion 802 but instead portion 802 is projected around portion 804 in FIG. 8A). In some embodiments, the first and the second displays are of the same type, (e.g., displays 402 and 404 are of the same type in FIG. 4A). In some embodiments, the first and the second displays are liquid crystal displays. In some embodiments, the first and the second displays have the same pixel resolution.

In some embodiments, the first display and the second display are distinct portions of a single display (e.g., portions 404-1 and 404-2 are portions of display 404 in FIG. 4F). In some embodiments, the first display and the second display are mutually exclusive to each other. The display device includes a fifth reflector (e.g., reflector 442) configured to receive the second light (e.g., light 418-4) provided by the second display and reflect the second light for conveyance to the first reflector in the second input direction.

In some embodiments, the display device includes an eye-tracking detector configured to receive third light (e.g., detector 702-1 receives light 704-1 in FIG. 7A). The third light from the common image plane is transmitted through the lens assembly (e.g., lens assembly 410) and the first reflector (e.g., reflector 412) toward the eye-tracking detector. The third light includes light from an eye of a wearer of the display device (e.g., an image of the eye of the wearer of the display device). The eye-tracking detector is configured to determine a position of a pupil of the eye of the wearer of the display device based on the light (e.g., the image) from the eye of the wearer of the display device.

In some embodiments, the display device includes an eye-tracking detector configured to receive third light (e.g., detector 702-2 receives light 704-2 in FIG. 7B). The third light from the common image plane is transmitted through the lens assembly (e.g., lens assembly 410), received and reflected by the first reflector (e.g., reflector 412), and received and transmitted through the second reflector (e.g., reflector 406) toward the eye-tracking detector. The third light includes light from an eye of a wearer of the display device. The eye-tracking detector is configured to determine a position of a pupil of the eye of the wearer of the display device based on the light from the eye of the wearer of the display device.

In some embodiments, the second reflector (e.g., reflector 406 in FIG. 7B) is a cold mirror transmitting light in the IR or NIR wavelength range while reflecting light in the visible wavelength range. In some embodiments, the third light is IR or NIR light.

In some embodiments, the one or more optical elements include a first reflector (e.g., reflector 412 in FIG. 4H), a second reflector (e.g., reflector 452), a first polarization plate (e.g., polarization plate 454), a second polarization plate (e.g., polarization plate 408) and a third reflector (e.g., reflector 406). The first reflector is configured to transmit light having a first polarization and reflect light having a second polarization that is distinct from the first polarization. The first reflector is also configured to receive, from a first input direction, the first light (e.g., light 420-1), having the first polarization, and receive, from the first input direction, the second light (e.g., light 418-5) having the second polarization so that the first light is transmitted through the first reflector and the second light is reflected from the first reflector. The second reflector is configured to reflect toward the first reflector, the second light reflected from the first reflector (e.g., reflector 452 receives and reflects light 418-5). The first polarization plate is located between the first reflector and the second reflector (e.g., polarization plate 454 is located between reflector 412 and reflector 452). The first polarization plate (e.g., polarization plate 454 is a quarter-wave plate) is configured to change a polarization of light transmitted through the first polarization plate so that the second light reflected from the first reflected passes through the first polarization plate toward the second reflector; the second light reflected from the second reflector passes through the first polarization plate toward the first reflector; the second light that has been reflected from the second reflector and transmitted through the first polarization plate has the first polarization (e.g., light 418-1 reflected from reflector 452 has the first polarization); and the first reflector transmits the second light that has been reflected from the second reflector and transmitted through the first polarization plate (e.g., light 418-1 is transmitted by reflector 412). The third reflector is configured to reflect toward the first reflector, the second light having the first polarization transmitted through the first reflector (e.g., reflector 406 reflects light 418-1 toward reflector 412). The second polarization plate is located between the first reflector and the third reflector (e.g., polarization plate 408 is located between reflector 412 and reflector 406). The second polarization plate (e.g., polarization plate 406 is a quarter-wave plate) is configured to change a polarization of light transmitted through the second polarization plate so that the second light transmitted from the first reflector passes through the second polarization plate toward the third reflector; the second light, reflected from the third reflector, passes through the first polarization plate toward the first reflector; the second light that has been reflected from the third reflector and transmitted through the second polarization plate has the second polarization (e.g., light 418-2 reflected from reflector 406 has the second polarization); and the first reflector reflects the second light having the second polarization that has been reflected from the third reflector and transmitted through the first polarization plate (e.g., light 418-2 is reflected by reflector 412). The display device is configured to project the first image and the second image on a common image plane (e.g., reference plane 416). In some embodiments, the first display and the second display are integrated as a single display (e.g., display 404). In some embodiments, the single display includes an array of light emitting devices (e.g., an LCD display).

In some embodiments, the first display and the second display are optically coupled with a third polarization plate having a first portion configured to transmit the first light having the first polarization and a second portion configured to transmit the second light having the second polarization (e.g., polarization plate 456 coupled with display 404 includes regions 456-1 and 456-2 in FIG. 4H). In some embodiments, the first portion is located around the second portion (e.g., region 502 is located around region 506 in FIG. 5). In some embodiments, the second portion is positioned in the middle of the first portion so that the first portion extends from the second portions on two sides of the second portion.

In some embodiments, at least one of the first display and the second display is optically coupled with a switchable polarization plate configured to sequentially transmit the first light having the first polarization and the second light having the second polarization based on light provided by the at least one of the first display and the second display (e.g., polarization plate 456 is a switchable polarization plate in FIG. 4H). For example, the switchable polarization plate transmits the light provided by the first and the second displays at a first time without changing a polarization of the light and transmits the light provided by the first display and the second display at a second time with changing the polarization of the light.

In some embodiments, the first display and the second display are optically coupled with a fourth polarization plate having a first portion, a second portion, and a third portion (e.g., regions 502, 504, and 506 in FIG. 5). The first portion is located around the third portion (e.g., region 502 is around region 504) and the third portion is located around the second portion (e.g., region 504 is around region 506). The first portion is configured to transmit the first light having the first polarization (e.g., light 420-1 in FIG. 4H). The second portion is configured to transmit the second light having the second polarization (e.g., light 418-5 in FIG. 4H). The third portion (e.g., region 504) includes a switchable polarization plate configured to conditionally transmit a portion of light provided by the first display as the first light having the first polarization or the second light having the second polarization.

In accordance with some embodiments, a method performed by a display device (e.g., display device 400 in FIG. 4A) including a first display, a second display and one or more optical elements is disclosed. The method includes providing, with the first display, a first light that corresponds to a first image and providing, with the second display, a second light that corresponds to the second image through the one or more optical elements. The method further includes projecting, with the one or more optical elements, a display image using the first light and the second light, the display image including the first image and the second image. The method also includes projecting, with the display device (e.g., the one or more optical elements of the display device), the first image with a first magnification and projecting, with the display device (e.g., the one or more optical elements of the display device), the second image with a second magnification that is distinct from the first magnification.

In some embodiments, at least a portion of the first image is projected around the projection of the second image.

In some embodiments, the display device (e.g., FIG. 4A) further includes a first reflector, a second reflector, and a first polarization plate located between the first reflector and the second reflector, and the method performed by the display device includes receiving, with the first reflector, the first light, from a first input direction, having a first polarization. The method also includes receiving, with the first reflector, the second light, from a second input direction that is distinct from the first input direction, having the first polarization, so that the first light is transmitted through the first reflector and the second light is transmitted through the first reflector. The first reflector is configured to transmit light having the first polarization through the first reflector and reflect light having a second polarization that is distinct from the first polarization. The method also includes reflecting, with the second reflector, the second light transmitted through the first reflector toward the first reflector. The method further includes changing, with the first polarization plate, a polarization of light transmitted through the first polarization plate so that the second light transmitted from the first reflector passes through the first polarization plate toward the second reflector; the second light, reflected from the second reflector, passes through the first polarization plate toward the first reflector; the second light that has been reflected from the second reflector and transmitted through the first polarization plate has the second polarization; and the first reflector reflects the second light that has been reflected from the second reflector and transmitted through the first polarization plate. In addition, the method includes projecting, with the display device, the first image and the second image on a common image plane.

In some embodiments, the first image and the second image received by the first reflector have a first image resolution (e.g., FIG. 4A).

In some embodiments, the first image projected on the common image plane has a second image resolution and the second image projected on the common image plane has a third image resolution distinct from the second image resolution (e.g., FIG. 8A).

In some embodiments, the second image projected on the common display image plane at least partially overlaps the first image projected on the common display image plane (e.g., FIG. 8A).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   a first display, with a first array of pixels, configured to provide first light that corresponds to a first image;
   a second display, with a second array of pixels distinct from the first array of pixels, configured to provide second light that corresponds to a second image; and
   one or more optical elements configured to project a display image using the first light and the second light, the display image including the first image and the second image, wherein:
      the one or more optical elements include:
         a first reflector configured to:
            transmit light having a first polarization and reflect light having a second polarization that is distinct from the first polarization; and
            receive, from a first input direction, the first light, having the first polarization, and receive, from a second input direction, the second light, having the first polarization so that the first light is transmitted through the first reflector and the second light is transmitted through the first reflector; and
         a second reflector configured to reflect, toward the first reflector, the second light transmitted through the first reflector; and
      the display device is configured to project the display image by projecting the first image with a first magnification and by projecting the second image with a second magnification that is distinct from the first magnification.

2. The display device of claim 1, wherein at least a portion of the first image is projected around the projection of the second image.

3. The display device of claim 1, wherein the second input direction is distinct from the first input direction and the one or more optical elements include:
   a first polarization plate located between the first reflector and the second reflector and configured to change a polarization of light transmitted through the first polarization plate so that:
      the second light transmitted from the first reflector passes through the first polarization plate toward the second reflector;
      the second light, reflected from the second reflector, passes through the first polarization plate toward the first reflector;
      the second light that has been reflected from the second reflector and transmitted through the first polarization plate has the second polarization; and
      the first reflector reflects the second light that has been reflected from the second reflector and transmitted through the first polarization plate,
   wherein:
      the display device is configured to project the first image and the second image on a common image plane.

4. The display device of claim 3, further comprising a lens assembly, wherein the lens assembly includes:
   a second polarization plate configured to receive, from the first reflector, the first light having the first polarization and transmit the first light so that the first light has a third polarization distinct from the first polarization and the second polarization and receive, from the first reflector, the second light having the second polarization and transmit the second light so that the second light has a fourth polarization distinct from the first polarization, the second polarization, and the third polarization;
   a third reflector configured to receive the first light having the third polarization and cause refraction of a refracted portion of the first light having the third polarization and receive the second light having the fourth polarization and cause refraction of a refracted portion of the second light having the fourth polarization;
   a third polarization plate configured to receive the refracted portion of the first light having the third polarization and transmit the refracted portion of the first light so that the refracted portion of the first light has a fifth polarization and receive the refracted portion of the second light having the fourth polarization and transmit the refracted portion of the second light so that the refracted portion of the second light has a sixth polarization that is distinct from the fifth polarization;
   a fourth reflector configured to receive the refracted portion of the second light having the sixth polarization and transmit the refracted portion of the second light having the sixth polarization and receive the refracted portion of the first light having the fifth polarization and reflect the refracted portion of the first light having the fifth polarization so that:
      the first light reflected from the fourth reflector passes through the third polarization plate toward the third reflector;
      a portion of the first light, reflected from the third reflector, passes through the third polarization plate toward the fourth reflector;
      the portion of the first light that has been reflected from the third reflector and transmitted through the third polarization plate has the sixth polarization; and
      the fourth reflector transmits the portion of the first light having the sixth polarization.

5. The display device of claim 4, including:
an eye-tracking detector configured to receive third light, wherein:
the third light from the common image plane is transmitted through the lens assembly and the first reflector toward the eye-tracking detector;
the third light includes light from an eye of a wearer of the display device; and
the eye-tracking detector is configured to determine a position of a pupil of the eye of the wearer of the display device based on the light from the eye of the wearer of the display device.

6. The display device of claim 4, including:
an eye-tracking detector configured to receive third light, wherein:
the third light from the common image plane is transmitted through the lens assembly, received and reflected by the first reflector, and received and transmitted through the second reflector toward the eye-tracking detector;
the third light includes light from an eye of a wearer of the display device; and
the eye-tracking detector is configured to determine a position of a pupil of the eye of the wearer of the display device based on the light from the eye of the wearer of the display device.

7. The display device of claim 3, wherein the first image and the second image received by the first reflector have a first image resolution.

8. The display device of claim 7, wherein:
the first image projected on the common image plane has a second image resolution,
the second image projected on the common image plane has a third image resolution distinct from the second image resolution, and
a difference between the second image resolution and the third image resolution is greater than a difference between a display resolution of the first display and a display resolution of the second display.

9. The display device of claim 3, wherein the first reflector has a first size and the first image from the first input direction has a second size distinct from the first size.

10. The display device of claim 3, wherein the second reflector is a curved reflector and reflecting the second light transmitted through the first reflector includes focusing the second light.

11. The display device of claim 3, wherein the second image projected on the common image plane at least partially overlaps the first image projected on the common image plane.

12. The display device of claim 3, wherein:
the first display and the second display are distinct portions of a single display; and
the display device includes a fifth reflector configured to receive the second light provided by the second display and reflect the second light for conveyance to the first reflector in the second input direction.

13. A display device comprising:
a first display, with a first array of pixels, configured to provide first light that corresponds to a first image;
a second display, with a second array of pixels distinct from the first array of pixels, configured to provide second light that corresponds to a second image; and
one or more optical elements configured to project a display image using the first light and the second light, the display image including the first image and the second image, wherein:
the one or more optical elements include:
a first reflector configured to:
transmit light having a first polarization and reflect light having a second polarization that is distinct from the first polarization; and
receive, from a first input direction, the first light, having the first polarization, and receive, from the first input direction, the second light having the second polarization so that the first light is transmitted through the first reflector and the second light is reflected from the first reflector;
a second reflector configured to reflect, toward the first reflector, the second light reflected from the first reflector; and
the display device is configured to project the first image and the second image on a common image plane.

14. The display device of claim 13, wherein:
the first display and the second display are optically coupled with a third polarization plate having a first portion configured to transmit the first light having the first polarization and a second portion configured to transmit the second light having the second polarization.

15. The display device of claim 13, wherein:
at least one of the first display and the second display is optically coupled with a switchable polarization plate configured to sequentially transmit the first light having the first polarization and the second light having the second polarization based on light provided by the at least one of the first display and the second display.

16. The display device of claim 13, wherein:
the first display and the second display are optically coupled with a fourth polarization plate having a first portion, a second portion, and a third portion, the first portion located around the third portion and the third portion located around the second portion, wherein:
the first portion is configured to transmit the first light having the first polarization;
the second portion is configured to transmit the second light having the second polarization; and
the third portion includes a switchable polarization plate configured to conditionally transmit a portion of light provided by the first display as the first light having the first polarization or the second light having the second polarization.

17. The display device of claim 13, wherein the one or more optical elements further include:
a first polarization plate located between the first reflector and the second reflector and configured to change a polarization of light transmitted through the first polarization plate so that:
the second light reflected from the first reflector passes through the first polarization plate toward the second reflector;
the second light reflected from the second reflector passes through the first polarization plate toward the first reflector;
the second light that has been reflected from the second reflector and transmitted through the first polarization plate has the first polarization; and
the first reflector transmits the second light that has been reflected from the second reflector and transmitted through the first polarization plate;
a third reflector configured to reflect, toward the first reflector, the second light having the first polarization transmitted through the first reflector; and a second polarization plate located between the first reflector and the third reflector and configured to change a polarization of light transmitted through the second polarization plate so that:
  the second light transmitted from the first reflector passes through the second polarization plate toward the third reflector;
  the second light, reflected from the third reflector, passes through the first polarization plate toward the first reflector;
  the second light that has been reflected from the third reflector and transmitted through the second polarization plate has the second polarization; and
  the first reflector reflects the second light having the second polarization that has been reflected from the third reflector and transmitted through the first polarization plate.

18. A method performed by a display device comprising a first display, a second display, and one or more optical elements including a first reflector and a second reflector, the method comprising:
  providing, with the first display including a first array of pixels, a first light that corresponds to a first image through the one or more optical elements;
  providing, with the second display including a second array of pixels distinct from the first array of pixels, a second light that corresponds to a second image through the one or more optical elements;
  projecting, with the one or more optical elements, a display image using the first light and the second light, the display image including the first image and the second image;
  projecting, with the one or more optical elements, the first image with a first magnification and projecting, through the one or more optical elements, the second image with a second magnification that is distinct from the first magnification; and
  receiving, with the first reflector, the first light, from a first input direction, having a first polarization, and receiving, with the first reflector, the second light, from a second input direction, having the first polarization, so that the first light is transmitted through the first reflector and the second light is transmitted through the first reflector, wherein the first reflector is configured to transmit light having the first polarization through the first reflector and reflect light having a second polarization that is distinct from the first polarization; and
  reflecting, with the second reflector, the second light transmitted through the first reflector toward the first reflector.

19. The method of claim 18, wherein the second input direction is distinct from the first input direction, the display device further includes a first polarization plate located between the first reflector and the second reflector, and the method comprises:
  changing, with the first polarization plate, a polarization of light transmitted through the first polarization plate so that:
    the second light transmitted from the first reflector passes through the first polarization plate toward the second reflector;
    the second light, reflected from the second reflector, passes through the first polarization plate toward the first reflector;
    the second light that has been reflected from the second reflector and transmitted through the first polarization plate has the second polarization; and
    the first reflector reflects the second light that has been reflected from the second reflector and transmitted through the first polarization plate; and
  projecting, with the display device, the first image and the second image on a common image plane.

20. The method of claim 19, wherein the first image and the second image received by the first reflector have a first image resolution.

* * * * *